US011032133B2

(12) United States Patent
Naylor et al.

(10) Patent No.: US 11,032,133 B2
(45) Date of Patent: *Jun. 8, 2021

(54) UNIVERSAL SCALING CONTROLLER FOR SOFTWARE NETWORK FUNCTIONS

(71) Applicant: Nefeli Networks, Inc., Berkeley, CA (US)

(72) Inventors: David Naylor, Berkeley, CA (US);
Daniele di Proietto, San Francisco, CA (US); Matthew Mussomele, Berkeley, CA (US); Kevin Fall, Piedmont, CA (US); Sylvia Ratnasamy, Berkeley, CA (US); Albert Christopher Torek, Oakland, CA (US)

(73) Assignee: Nefeli Networks, Inc., Berkeley, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 16/353,062

(22) Filed: Mar. 14, 2019

(65) Prior Publication Data
US 2020/0028741 A1 Jan. 23, 2020

Related U.S. Application Data

(63) Continuation of application No. 16/039,267, filed on Jul. 18, 2018, now Pat. No. 10,243,789.

(51) Int. Cl.
H04L 12/24 (2006.01)
H04L 12/825 (2013.01)
(Continued)

(52) U.S. Cl.
CPC ........ H04L 41/0806 (2013.01); H04L 41/083 (2013.01); H04L 43/0894 (2013.01);
(Continued)

(58) Field of Classification Search
CPC . H04L 41/00; H04L 41/0806; H04L 41/0896; H04L 43/16; H04L 43/0829;
(Continued)

(56) References Cited

U.S. PATENT DOCUMENTS 9,571,407 B2 2/2017 Harvell
10,243,789 B1 3/2019 Naylor et al.
(Continued)

FOREIGN PATENT DOCUMENTS

KR 101039550 B1 6/2011

OTHER PUBLICATIONS

Autoscaling using Ceilometer/Aodh, OpenStack, 5 pages, Updated Jul. 17, 2018, Accessed on Jul. 18, 2018 via the Internet: https://docs.openstack.org/senlin/latest/scenarios/autoscaling_ceilometer.html.

(Continued)

Primary Examiner — Peter Chen
(74) Attorney, Agent, or Firm — MLO, a professional corp.

(57) ABSTRACT

A method for universal scaling of software network functions involves receiving, at a switch of a network, a batch of data units during a first period. The network further includes one or more network function (NF) instances of an NF service, and a scaling controller. The switch transmits one or more units of data during the first period to an NF instance of the NF service. An estimated maximum safe data unit rate is determined for the NF instance, and a representative safe data unit rate is determined for the NF service. A total number of data units designated to be received by the NF service during the first period is determined, and a total number of NF instances of the NF service to be provisioned (Continued)

in the network is determined at the scaling controller using the estimated total number of data units and the representative safe data unit rate.

21 Claims, 15 Drawing Sheets

(51) Int. Cl.
    *H04L 29/08*     (2006.01)
    *H04L 29/06*     (2006.01)
    *H04L 12/861*     (2013.01)
    *H04L 12/26*     (2006.01)

(52) U.S. Cl.
    CPC .............. *H04L 47/25* (2013.01); *H04L 49/90* (2013.01); *H04L 63/02* (2013.01); *H04L 67/34* (2013.01); *H04L 41/142* (2013.01)

(58) Field of Classification Search
    CPC ............. H04L 43/0852; H04L 43/0876; H04L 43/0894; H04L 47/10; H04L 47/12; H04L 47/125; H04L 49/90; H04L 63/02; H04L 65/103; H04L 65/104; H04L 67/34; H04L 5/0064
See application file for complete search history.

(56) References Cited

U.S. PATENT DOCUMENTS

| | | |
|---|---|---|
| 2004/0136379 A1 | 7/2004 | Liao et al. |
| 2008/0049640 A1 | 2/2008 | Heinz et al. |
| 2016/0173394 A1 | 6/2016 | Harvell |
| 2017/0359749 A1 | 12/2017 | Dao |
| 2019/0379591 A1* | 12/2019 | Boughzala .............. H04L 45/00 |

OTHER PUBLICATIONS

Fei et al., Adaptive VNF Scaling and Flow Routing with Proactive Demand Prediction, INFOCOM 2018—The 37th Annual IEEE InternationalConference on Computer Communications. IEEE, Apr. 2018, pp. 486-494.

Notice of Allowance dated Nov. 9, 2018 for U.S. Appl. No. 16/039,267.

Wang et al., Online VNF Scaling in Datacenters, ARXIV, eprint arXiv:1604.01136, Apr. 2016, 9 pages.

International Search Report dated Oct. 25, 2019 for PCT Patent Application No. PCT/US2019/041654.

* cited by examiner

| | |
|---|---|
| $b_t$ | Num packets entering the system during time t |
| $b_{i,t}$ | Num packets to be processed by NF service i ($NF_i$) during time t |
| $m_{i,t}$ | Actual num packets an instance of $NF_i$ can process during time t |

FIG. 7A

| | |
|---|---|
| $I$ | Number of NF services being monitored by the Scaling Controller |
| $J$ | Number of instances of an NF service i ($NF_i$) during time t |
| $m'_{i,t}$ | Estimated num packets NF service $NF_i$ can process during time t |
| $m'_{i,j,t}$ | Estimated num packets NF instance j ($NF_{i,j}$) can process during time t |
| $q_{i,j,t}$ | Switch queue occupancy for NF instance j ($NF_{i,j}$) at end of time t |
| $l_{i,j,t}$ | Num packets dropped from queue for instance $NF_{i,j}$ during time t |
| $n_{i,t}$ | Number of instances of $NF_i$ at time t |
| $o_{i,j,t}$ | Explicit overload signal for instance $NF_{i,j}$ |
| $u_{i,j,t}$ | Explicit underload signal for instance $NF_{i,j}$ |
| $c_{i,j,t}$ | Average CPU utilization for instance $NF_{i,j}$ during time t |
| $c^*_i$ | Flag for whether CPU utilization should be taken into account for $NF_i$ |
| $p_{i,j,t}$ | Num packets placed in switch queue for instance $NF_{i,j}$ during time t |
| $p'_{i,j,t}$ | Num packets dequeued by instance $NF_{i,j}$ during time t |
| full_EMAvg_$p'_{i,j,t}$ | Full distribution of $p'_{i,j}$ over time |
| full_EMVar_$p'_{i,j,t}$ | Full variance of $p'_{i,j}$ over time |
| over_EMAvg_$p'_{i,j,t}$ | Distribution of $p'_{i,j}$ over time during overload |
| over_EMVar_$p'_{i,j,t}$ | Variance of $p'_{i,j}$ over time during overload |

FIG. 7B

| | |
|---|---|
| t | A window of time having a configurable duration |
| α | Constant for calculating full_EMAvg_$p'_{i,j,t}$ and over_EMAvg_$p'_{i,j,t}$ |
| $C_o$ | CPU utilization overload threshold (e.g., 0.9) |
| $C_u$ | CPU utilization underload threshold (e.g., 0.5) |

FIG. 7C

| $e_{i,t}$ | Control error for $NF_i$ at time t |
|---|---|
| n_adj | Delta of instances of $NF_i$ to provision/de-provision |
| $K_p$ | Proportional Gain |
| $K_i$ | Integral Gain |
| $K_d$ | Derivative Gain |

…

UNIVERSAL SCALING CONTROLLER FOR SOFTWARE NETWORK FUNCTIONS

RELATED APPLICATION

This application is a continuation of U.S. patent application Ser. No. 16/039,267, filed Jul. 18, 2018, and now issued as U.S. Pat. No. 10,243,789, all of which is incorporated by reference herein in its entirety for all purposes.

BACKGROUND

Software network functions (NFs) are software applications that process packets from a network traffic stream. Examples of NF services include network intrusion detection systems (IDS), protocol or WAN optimizers, firewalls, Network Address Translators (NATs), and so forth.

Packets of the network stream are processed by one or more NF instances of an NF service. For example, if traffic is processed by both a firewall and a load balancer, there may be three firewall instances and two load balancer instances. Each NF instance is allocated some amount of resources (primarily CPU cores and bytes of memory). Given a fixed resource allocation, an NF instance can process a limited number of packets per second without introducing latency or dropping an unacceptable number of packets. If the input traffic rate exceeds this rate, an NF is said to be in an overload state. That is, when an NF instance cannot or will not (e.g., due to a policy or licensing decision) process packets at the rate at which it receives the packets, it is in an overload state. In contrast, when an NF instance receives packets at a rate that is significantly less than the rate at which it can process packets, it is in an underload state. When an NF is in an overload state, network traffic latency may be undesirably increased and/or packets of the network traffic stream may be dropped. To mitigate such potentially unacceptable effects, multiple instances of the NF are needed.

The problem of scaling NF instances in a network arises in the context of many scalable software services; e.g., web services. A typical approach in many such contexts is to monitor a CPU load of a processor implementing an NF instance. If the CPU load of that processor exceeds a pre-defined threshold for a given duration, an additional NF instance is provisioned (e.g., installed and/or running as software, as dedicated hardware, or otherwise implemented). However, some NFs implement a polling routine that checks for new network data from the network traffic stream at a high frequency. Because of the high-frequency polling rate, the CPU running that NF will indicate a utilization of 100%. Thus, CPU load may not always be relied upon as an indicator of NF overload or underload.

SUMMARY

In some embodiments, a method for scaling software network functions using a universal scaling controller ("scaling controller") involves receiving a batch of data units at a switch of a network during a first period of time. The network further includes i) one or more network function (NF) instances of an NF service, and ii) a scaling controller. One or more units of data of the batch of data are transmitted from the switch to a first NF instance of the one or more NF instances during the first period of time. An estimated maximum safe data unit rate is determined for the first NF instance. A representative estimated maximum safe data unit rate for the NF service is determined using the estimated maximum safe data unit rate, and an incoming data unit rate of the NF service is determined. A total number of NF instances of the NF service to be provisioned in the network is determined at the scaling controller using the determined incoming data unit rate of the NF service and the representative estimated maximum safe data unit rate of the NF service.

In some embodiments, a method for scaling software network functions using a universal scaling controller involves determining a total number of data units transmitted from a node of a network to an NF instance of the network during a period of time, the NF instance being an instance of an NF service. A total number of data units designated to be received by the NF instance during the period of time is determined. An estimated maximum safe data unit rate for the NF instance is determined based on the total number of data units transmitted from the node and the total number of data units designated to be received by the NF instance. A representative estimated maximum safe data unit rate for the NF service is determined using the estimated maximum safe data unit rate. A total number of data units designated to be received by the NF service during a subsequent period of time is estimated at a scaling controller of the network, and a total number of NF instances of the NF service to be provisioned in the network is determined at the scaling controller using the estimated total number of data units designated to be received by the NF service and the representative estimated maximum safe data unit rate of the NF service.

In some embodiments, a method for scaling software network functions using a universal scaling controller involves determining a total number of data units transmitted from a node of a network to an NF instance of the network during a period of time, the NF instance being an instance of an NF service. A total number of data units designated to be received by the NF instance during the period of time is determined. An estimated maximum safe data unit rate for the NF instance is determined based on the total number of data units transmitted from the node and the total number of data units designated to be received by the NF instance. A representative estimated maximum safe data unit rate for the NF service is determined using the estimated maximum safe data unit rate. A total number of data units designated to be received by the NF service during a subsequent period of time is estimated at a scaling controller of the network, and an overload signal based on the estimated total number of data units designated to be received by the NF service and the representative estimated maximum safe data unit rate of the NF service is generated at the scaling controller.

BRIEF DESCRIPTION OF THE DRAWINGS

FIG. 7A is a table of network parameters determined by, or used for, a method for universal scaling of software network functions, in accordance with some embodiments.

FIG. 7B is a table of network state variables determined by, or used for, a method for universal scaling of software network functions, in accordance with some embodiments.

FIG. 7C is a table of configurable parameters of a method for universal scaling of software network functions, in accordance with some embodiments.

DETAILED DESCRIPTION

Figure 1A:
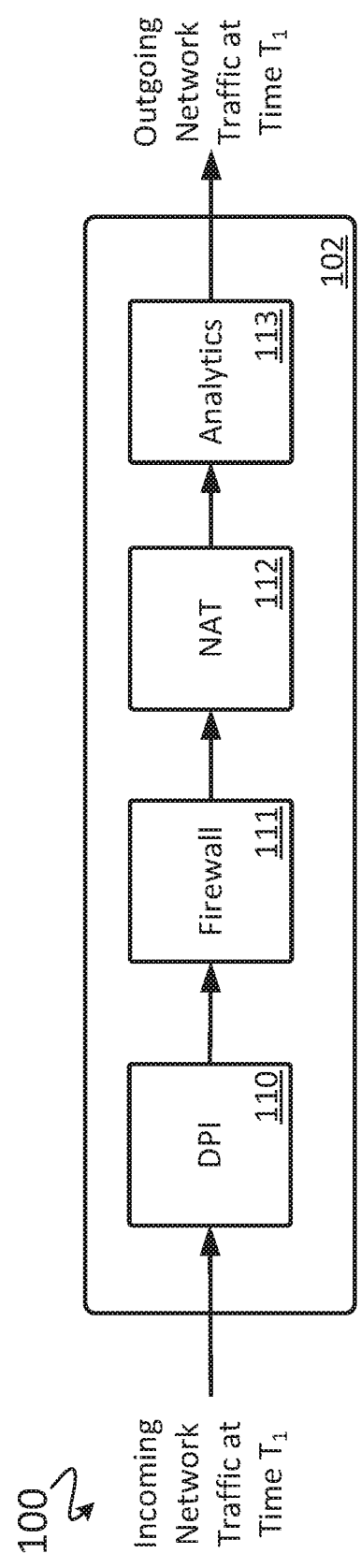
FIG. 1A illustrates an example of a chain of software network functions of a network receiving a network traffic stream at a first rate, in accordance with some embodiments.

Embodiments of systems and methods for scaling software network functions (NFs) using a universal scaling controller (USC, or "scaling controller") are described herein. The USC addresses the problem of determining an optimal number of NF instances of an NF service to run within a network given an incoming packet rate or estimated future packet rate. An optimal number of NF instances ensures that the NF service does not introduce additional latency or drop more packets than expected, while also not wasting system resources by provisioning superfluous NF instances.

In accordance with some embodiments, the USC generally i) estimates a maximum "safe" packet rate for each NF instance of an NF service, ii) uses those estimates to determine a representative estimated maximum safe packet rate for the NF service, iii) determines a current packet rate or estimated future packet rate for the NF service, and iv) uses the representative estimated maximum safe packet rate and the current packet rate or estimated future packet rate for the NF service to determine how many NF instances of the NF service should be provisioned. In some embodiments, a provisioning module receives an indication of the USC's determination and provisions or de-provisions NF instances based on that indication. In other embodiments, the USC simply emits an overload/not-overload or overload/underload signal (e.g., a health, control, or monitor signal) which can be used by other nodes of the network.

The USC provides increased stability of the network by considering all NF instances of an NF service globally rather than on a per-instance basis. Because of this global view, situations where a typical NF provisioning controller (i.e., one that does not consider all NF instances of an NF service globally or that considers NF instances only on a per-instance basis) might simultaneously dictate that an additional NF instance should be provisioned (because one NF instance is overloaded), and dictate that an NF instance should be de-provisioned (because another NF instance is underloaded), are avoided.

Additionally, the USC advantageously does not require any knowledge about how particular NFs function internally and does not require cooperation from the NFs themselves. Rather, the USC bases scaling directives on a number of metrics which include (1) queue occupancy of network switches which transmit packets to the NF instances, (2) packet loss from the network switches, (3) packet rate, and secondary metrics which will be described. These metrics can typically be determined for any NF.

An NF service in this context is a logical construct that is implemented in the network by one or more NF instances. An NF instance is an application that is provisioned (e.g., installed and/or running as software, as dedicated hardware, or otherwise implemented in or on a computer device or specialized network hardware device) within the network. The performance of an NF service is generally based on a throughput of packets by each NF instance of that NF service. Typically, when an NF instance is provisioned at a compute node, that NF instance is allocated a fixed CPU and memory allocation of the compute node and these allocations determine a maximum throughput of packets by the NF instance. Thus, the number of NF instances of an NF service needed at a given time can be determined almost entirely by the amount of network traffic that each of the NF instances can process as compared to the amount of network traffic designated to be processed by the NF service. This contrasts with typical scaling solutions, such as those implemented for scaling virtual machine (VM) instances, which may scale based on factors such as memory usage or CPU loading of compute nodes.

In the context of NFs, CPU load alone generally cannot be relied upon as an indicator of NF instance loading. This is because many NFs implement a high-frequency polling routine to check for new network data from the network traffic stream. Due to this high-frequency polling rate, a CPU will typically indicate a utilization of 100%. Because CPU utilization may not be an accurate indicator of an NF instance overload/underload condition, the USC uses processed packet rate as a primary metric to determine NF instance provisioning. However, using processed packet rate as a primary metric requires a reliable estimate of an NF's maximum packet processing rate (e.g., how quickly an NF instance is able to receive new packets from a packet sender, such as a switch, and/or how quickly the NF instance can process those packets), which is heavily dependent on workload and thus changes over time. To address this challenge, the USC uses queue occupancy of the network switches and packet loss from the network switches (as well as secondary metrics, when available) to estimate a maximum safe data or packet processing rate for each NF instance. The aggregate of estimated maximum data unit/packet processing rates corresponding to the set of NF instances of the NF service is then used to determine an estimated maximum safe data unit/packet processing rate that is representative of the NF service. A "representative" estimated maximum safe packet/data unit rate, or "representative estimated maximum safe data unit rate" of an NF service is an estimate of a maximum packet/data unit rate that the NF service can process without introducing unacceptable latency or dropping an unacceptable number of packets and is determined using the estimated maximum safe packet/data unit rates of the NF instances of that NF service.

In addition to using an estimated maximum data unit/packet processing rate as a metric to determine NF scaling, the USC uses secondary metrics such as explicit signals from an NF instance, from a compute node, from an NF manager module, or even CPU utilization when these metrics are available and useful (e.g., if the NF does not poll, or polling routines are directed to a particular core of a compute node). However, these secondary metrics are not required, which advantageously results in a solution that is more general than one that requires such metrics.

Based on the representative estimated maximum safe data unit rate for the NF service, and based on a determined or estimated incoming data unit rate designated to be received by the NF service, in some embodiments the USC determines the number of NF instances of an NF service that should be provisioned within the network and communicates that number to a NF provisioning control module. This communication is declarative, in that the USC indicates a total number of NF instances which should be running in the network at a given time. This is in contrast to typical solutions which generally provide iterative directives such as "add one NF instance" or "remove one NF instance." A declarative provisioning control signal advantageously prevents scenarios where an NF provisioning controller is directed to add an NF instance, the new NF instance boots slowly, and the NF provisioning controller erroneously provisions additional NF instances in the meantime.

In some embodiments, the USC is implemented as a software component on a compute node in a cluster of compute nodes where the software NFs and other management software run. However, the USC could be provisioned elsewhere (e.g., as a centralized cloud service that manages scaling for multiple, independent software NF clusters). In some embodiments, the USC receives additional information from sources like a compute node's network interface cards (NICs), or a compute node cluster's top of rack (ToR) switch (i.e., a network switch placed at a rack that includes multiple compute nodes).

The estimated maximum safe packet rate (also referred to as an "estimated maximum safe data unit rate") for an NF instance is an estimate of a maximum packet/data rate that the NF instance should be able to handle without experiencing overload. A packet rate is a ratio (e.g., packets per second) of the number of packets transmitted or received by an element of the network to a period of time (e.g., a time window such as 100 us, 1 ms, 100 ms, 1 s, 10 s, 30 s, etc.) during which they are received. During each window of time, the USC calculates the estimated maximum safe packet rate for each NF instance of each NF service. The estimated maximum safe packet rate is a different value than a maximum possible rate that the NF instance can handle (e.g., the absolute fastest the NF instance can process packets). The estimated maximum safe packet rate is based on an "overload" distribution of processed batch sizes at an overload-inducing load which is updated for each NF instance over multiple periods of time. A "batch" is a set or group of one or more packets, bits, bytes, or other units of data. A "packet" is taken to mean a single unit of data ("data unit") exchanged between peers of a network. A packet, or data unit, can be a bit, a portion of a bit stream, a byte, a block of data, an encapsulated block of data, a protocol data unit (PDU), or other portion of data.

In some embodiments, an exponentially weighted moving average and a variance corresponding to processed batch sizes when the NF instance is experiencing overload is calculated. In some embodiments, the estimated maximum safe packet rate of an NF instance is the central tendency of the overload distribution minus a measure of dispersion. For example, in some embodiments, the estimated maximum safe packet rate of an NF instance is the mean of the overload distribution minus two standard deviations. In other embodiments, the estimated maximum safe packet rate of an NF instance is the median of the overload distribution minus two standard deviations.

In some embodiments, the representative estimated maximum safe packet rate of an NF service is the largest estimated maximum safe packet rate of the NF instances of that NF service. In other embodiments, the representative estimated maximum safe packet rate of an NF service is the median or average estimated maximum safe packet rate of the NF instances of that NF service. In still yet other embodiments, the representative estimated maximum safe packet rate of an NF service is an aggregate of the estimated maximum safe packet rates of the NF instances of that NF service.

In addition to the overload distribution of processed batch sizes at an overload-inducing load, a "full" distribution of processed batch sizes is generated. If it is ever the case that the central tendency of the full distribution is larger than (e.g., has more probability mass to the right of) the central tendency of the overload distribution, this indicates that the overload distribution has become out-of-date or "stale." In accordance with some embodiments, until the overload distribution is updated the full distribution is used to determine the representative estimated maximum safe packet rate. Details of the USC related processes are further described herein.

FIG. 1A shows an example software network function chain (SFC) 102 of a network 100 which operates on an incoming network traffic stream during a time window designated as $T_1$. The SFC includes a deep-packet-inspection (DPI) NF service 110, a firewall NF service 111, a network-address-translation (NAT) NF service 112, and an analytics NF service 113. During the time window $T_1$, the SFC 102 operates on the incoming network traffic stream without any of the NF services 110-113 experiencing an overload condition. This contrasts with FIG. 1B, which shows the same SFC 102 operating on an incoming network traffic stream during a time window designated as $T_2$. As illustrated by a thicker line, the network traffic stream during time window $T_2$ enters the SFC 102 at a higher packet rate than during the time window $T_1$. The firewall NF service 111 is not able to process packets of the incoming network traffic stream at the increased data unit/packet rate. As a result, the firewall NF service 111 is overloaded and may introduce latency or even drop packets. Increased latency and/or dropped packets is illustrated by the dotted line exiting the firewall NF service 111.

Figure 1B:
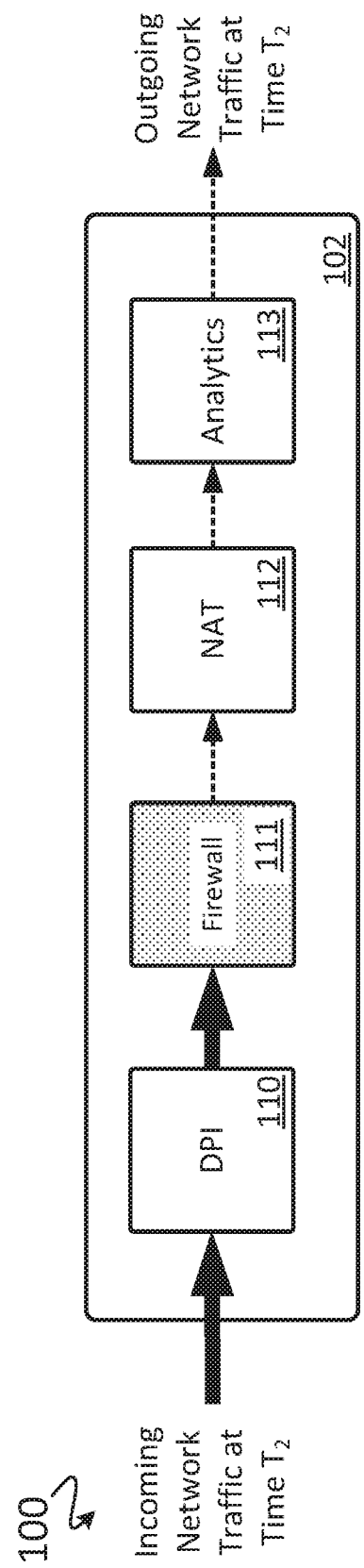
FIG. 1B illustrates the chain of software network functions receiving a network traffic stream at a second rate, in accordance with some embodiments.
Figure 2:
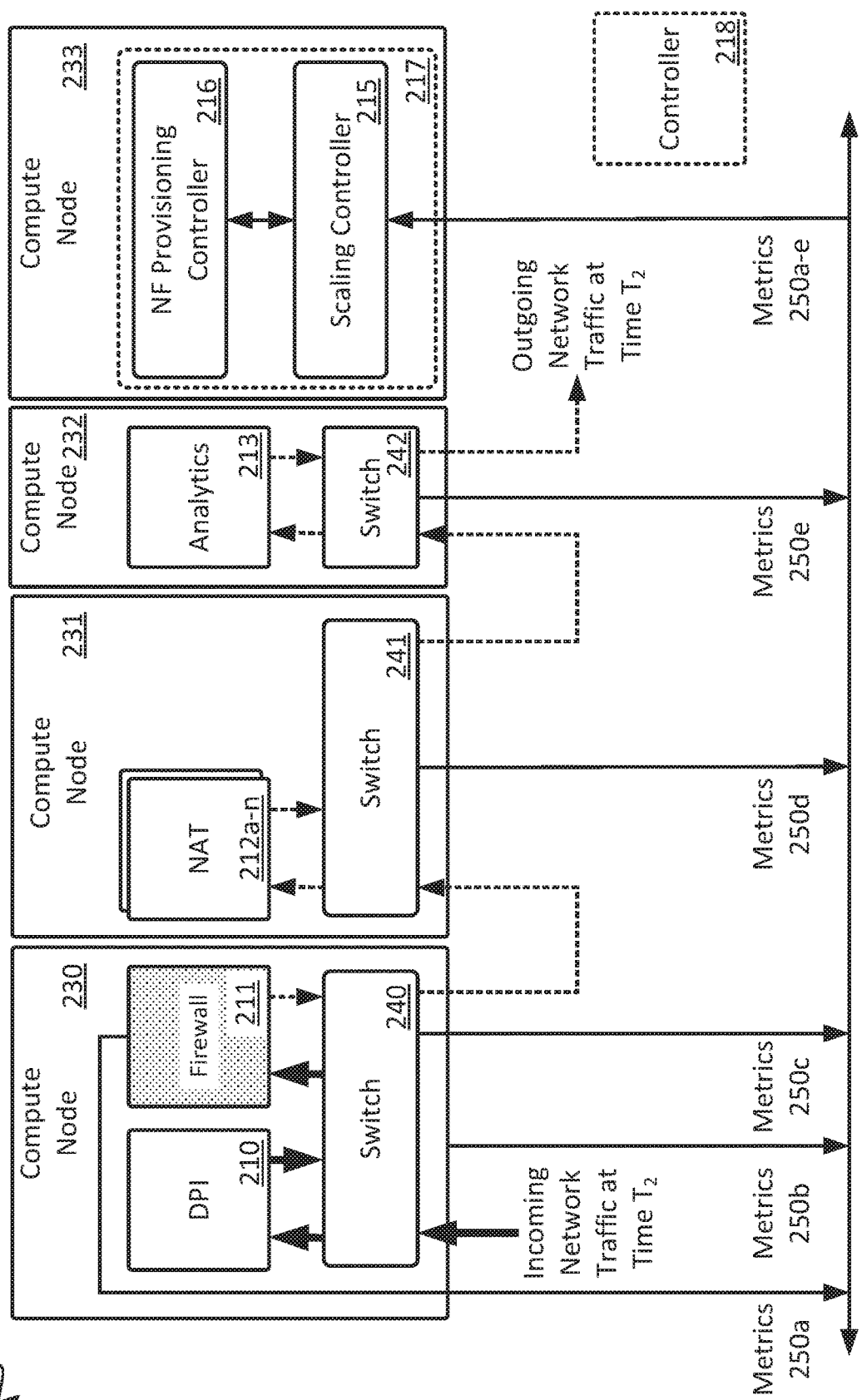
FIGS. 2-3 illustrate a network traffic stream traversing an example network architecture for universal scaling of software network functions, in accordance with some embodiments.

FIG. 2 illustrates an incoming network traffic stream traversing an example network architecture 200 for universal scaling of software network functions during the time window $T_2$, in accordance with some embodiments. The network architecture 200 includes an implementation of the logical SFC shown in FIGS. 1A-B. As shown, each of the NF services 110-113 of FIGS. 1A-B is implemented as one or more NF instances distributed across compute nodes 230-232. For instance, the DPI NF service 110 is implemented as DPI NF instance 210, the firewall NF service 111 is implemented as firewall NF instance 211, the NAT NF service 112 is implemented as multiple NAT NF instances 212a-n, and the analytics NF service 113 is implemented as the analytics NF instance 213. Each of the NF instances 210-213 receives incoming network traffic from, and transmits network traffic to, one or more network switches 240-242. In some embodiments, one or more of the network switches 240-242 is a software switch (e.g., a virtual switch). In other embodiments, one or more of the network switches 240-242 is a hardware switch. As shown, the switch 240 receives data (e.g., bits, bytes, packets) from the network as incoming network traffic during a time window $T_2$. The network traffic traverses the NF instances 210-213 via the switches 240-242 and continues to other network nodes (not shown) after egress from the switch 242.

A universal scaling controller (USC) 215 and an NF provisioning controller 216 operate at compute node 233 and are communicatively coupled with each other to exchange information related to provisioning/de-provisioning NF instances, as well as other system states and/or metrics. In some embodiments, the compute node 233 includes a network switch (similar to the switches 240-242) that is coupled to the USC 215. In some embodiments, the controllers 215-216 are modules of a network controller module 217 (e.g., an NF management and organization module (MANO)) provisioned at the compute node 233. In other embodiments, the controllers 215-216 are stand-alone modules, are integrated into a single module, or are included in a network controller 218 that is provisioned outside of the compute node 233. The controllers 215-216 are configured to implement all or a portion of the methods described herein for universal scaling of software network functions.

The USC 215 receives metrics 250a-e from a variety of sources within the network 200. Examples of such metrics include the metrics 250a from the firewall NF 211, the metrics 250b from the compute node 230, and the metrics 250c-e from the switches 240-242. In the example shown, the metrics 250a originate at the firewall NF 211, or a controller module of the firewall NF 211, and include an explicit signal, state, value, data structure, flag or another indicator, such as an overload/underload signal. The metrics 250b originate at the compute node 230 and include a signal, state, value, data structure, flag or another indicator from an operating system module, a hypervisor, a userspace program, a virtual machine, or another module located at the compute node 230. In some embodiments, the metrics 250b include data indicative of CPU loading measurement and/or memory utilization measurement. The metrics 250c-e include signals, states, values, data structures, or other indicators transmitted from the switches 240-242. In some embodiments, the metrics 250c-e include data indicative of amounts of data (packets, bits, bytes, etc.) received by the respective switch, amounts of data transmitted by the respective switch, queue occupancy indicators, indicators of lost data, or other information. In other embodiments, the USC 215 receives similar metrics, or other metrics related to the operation of the NF instances 210-213, the compute nodes 230-233, or other monitoring components (not shown), from additional sources or a different combination of sources (e.g., any of the NF instances 210-213 or other monitoring components or network probe modules (not shown)).

The USC 215 uses the received metrics 250a-e to determine a total number of NF instances of an NF service that should be provisioned in the network 200 given the actual, estimated, or anticipated data rate of the incoming network traffic and an estimated maximum safe data unit rate that each NF instance of an NF service can "safely" process without experiencing overload. If the total number of NF instances that should be provisioned for a particular NF service is greater than the total number of NF instances that are currently provisioned for that service, additional NF instances of that NF service are caused to be provisioned by the NF provisioning controller 216 (e.g., to mitigate the effects of overload). Conversely, if the total number of NF instances that should be provisioned for a particular NF service is less than the total number of NF instances that are currently provisioned for that service, NF instances of that NF service are de-provisioned by the NF provisioning controller 216 (e.g., to prevent underload). De-provisioning unnecessary NF instance advantageously conserves system resources of the network 200 and potentially saves money for an operator of the network by reducing software licensing fees. The NF provisioning controller 216 is communicatively coupled to the USC 215, but does not have to reside on the same compute node as the USC 215.

Similar to FIG. 1B, the single instance of the firewall NF 211 cannot process data of the incoming network data stream at a sufficient rate and is thus considered to be overloaded. Because the firewall NF 211 is overloaded, the network data stream downstream of the firewall NF 211 may experience increased latency and/or dropped packets as illustrated by a dotted line.

Figure 3:
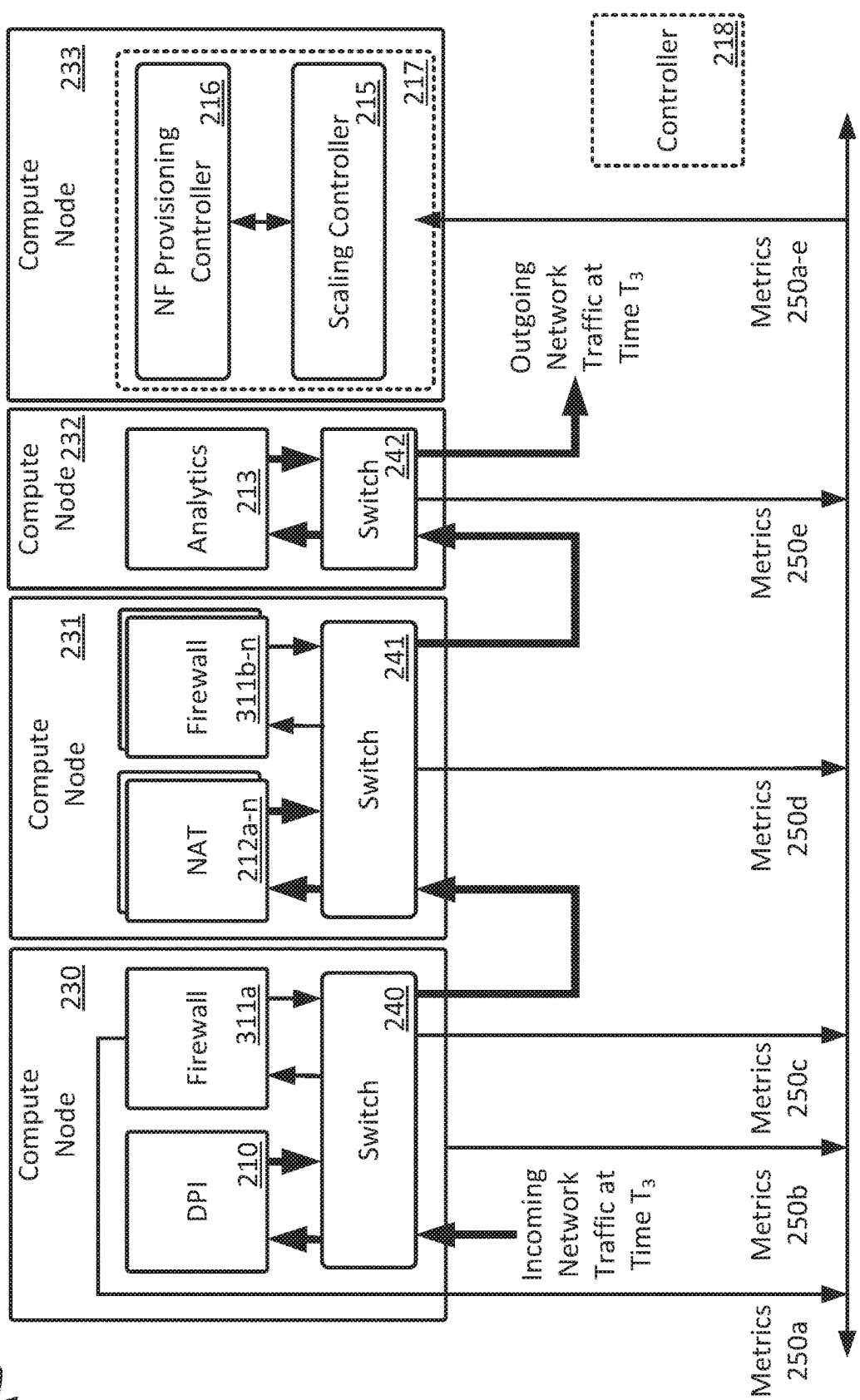

FIG. 3 illustrates a network 300, which is similar to the network 200, after the USC 215 has indicated to the NF provisioning controller 216 that additional instances of the firewall service 111 should be provisioned. As shown, a firewall NF instance 311a (similar to the firewall NF instance 211) is provisioned at the compute node 230 and firewall instances 311b-n are provisioned at the compute node 231. As a result of provisioning additional instances of the firewall service 111, incoming network traffic during a time window $T_3$ does not induce an overload state in the firewall NF instances 311a-n. Thus, the outgoing network traffic will not experience increased latency or dropped packets as was illustrated in FIG. 2.

Figure 4:
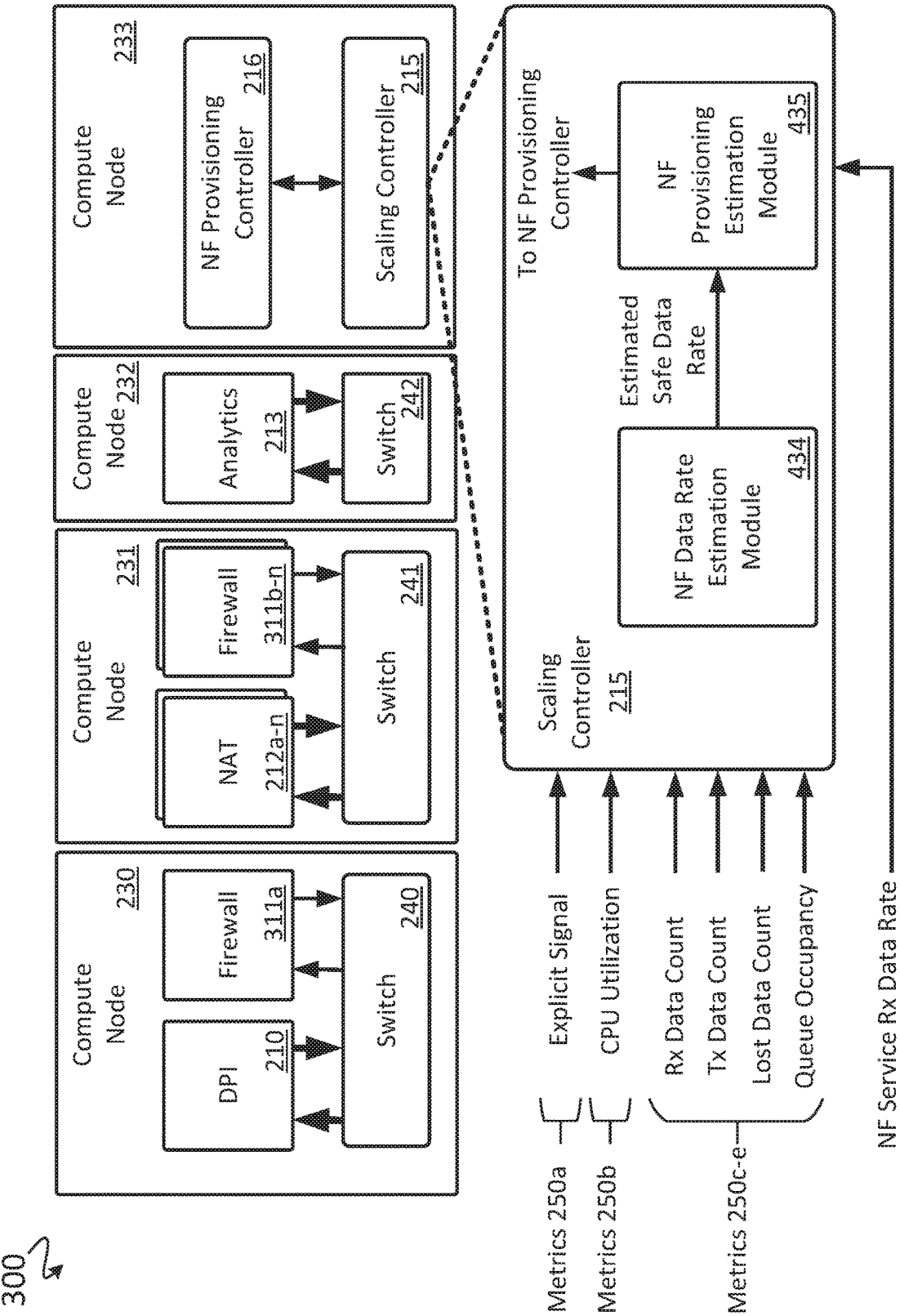
FIG. 4 illustrates details of an architecture with a universal scaling controller for software network functions, in accordance with some embodiments.

FIG. 4 provides additional details of the USC 215 of the network 300, in accordance with some embodiments. As shown, the USC 215 generally includes an NF data rate estimation module 434 and an NF provisioning estimation module 435. As described herein, the modules 434-435 are configured to carry out all or a portion of the methods for universal scaling of software network functions, in accordance with some embodiments. As shown, one or both of the modules 434-435 of the USC 215 receive the metrics 250a-e. By way of example, and continuing in the context of the firewall service 111, the metrics 250a include an explicit signal from the firewall NF instance 311a (e.g., an overload/ underload flag), the metrics 250b include a measure of CPU utilization from the compute node 230 (e.g., 90%), and the metrics 250c-e include a received (Rx) data count, a transmitted (Tx) data count, a lost data count, and a measure of queue occupancy from the switch 240. The USC 215 also receives a measure or estimation of a current or anticipated packet rate (NF service Rx data rate) that is designated to be received by the firewall NF service 111.

Figure 5:
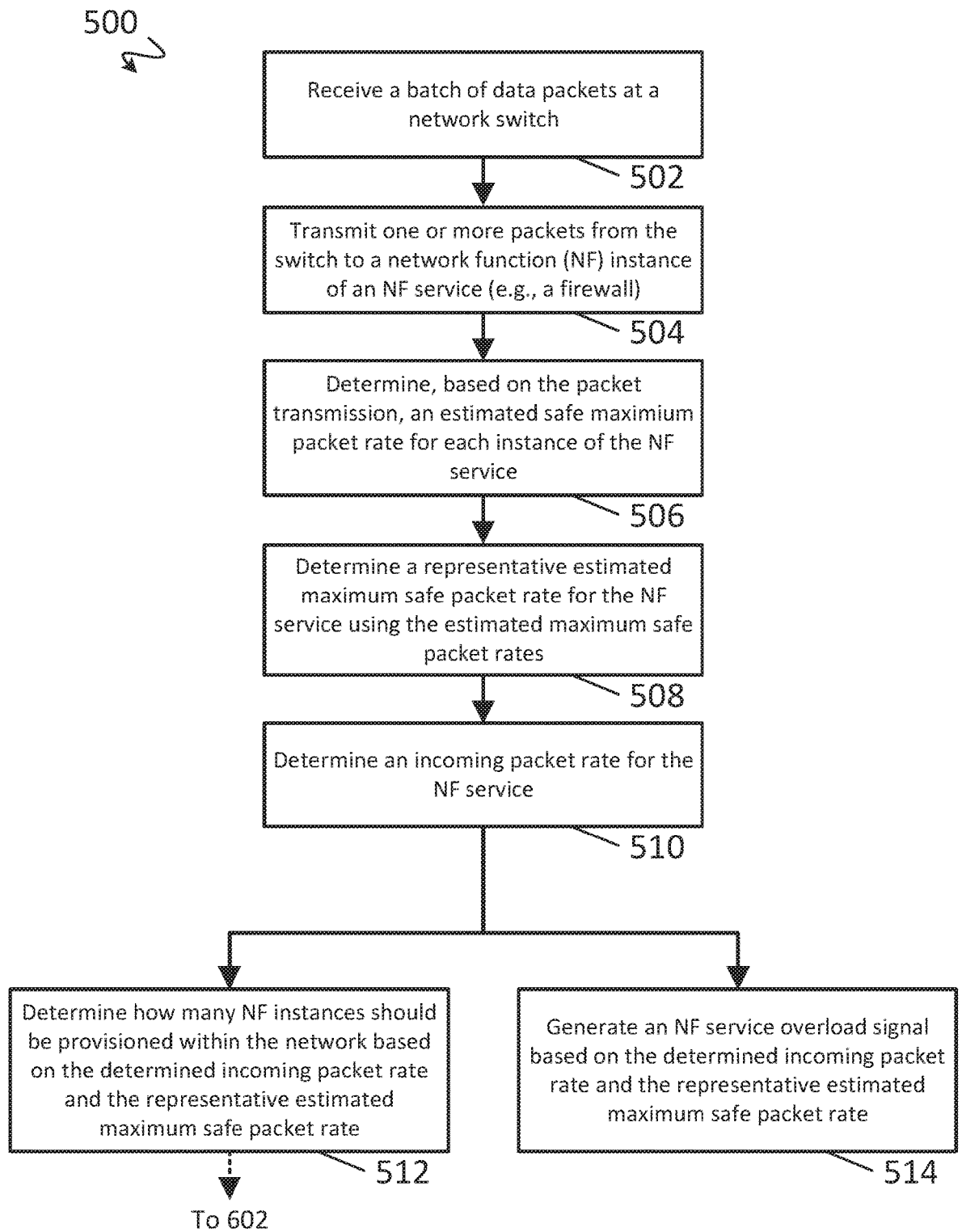
FIGS. 5-6 illustrate portions of a method for universal scaling of software network functions, in accordance with some embodiments.

FIG. 5 illustrates a portion of a process 500 which is performed all or in part at the USC 215, in accordance with some embodiments. The particular steps, order of steps, and combination of steps are shown for illustrative and explanatory purposes only. Other embodiments can implement different particular steps, orders of steps, and combinations of steps to achieve similar functions or results. The steps of FIG. 5 are described with reference to FIGS. 2-4. At step 502, a batch of data packets is received at the network switch

240. At step 504, one or more packets are transmitted from the switch 240 to an NF instance of an NF service. For example, the switch 240 transmits one or more units of data to the firewall NF instance 211 of the firewall service 111. At step 506, an estimated maximum safe packet rate is determined for each instance of the NF service, and at step 508 a representative estimated maximum safe packet rate is determined for the NF service using the estimated maximum safe packet rates. In some embodiments, steps 506 and 508 are performed at the NF Data Rate Estimation Module 434. In other embodiments, all or a portion of step 506 is performed at a network switch (e.g., the switch 240). Details of steps 506 and 508 are discussed with reference to FIGS. 8-12. At step 510, an incoming packet rate for the NF service is determined. In some embodiments, the determined incoming packet rate is equal to a total number of packets designated to be received by the NF service, divided by a duration of time during which those packets will be received by the NF service (e.g., packets per second). For example, a packet or unit of data having a destination address that corresponds to an NF instance of an NF service is "designated" to be received by the NF service. Or, as another example, a data packet or unit of data associated with an NF service header (NSH) which identifies the NF service, or an NF instance of the NF service is "designated" to be received by the NF service. In some embodiments, the total number of packets designated to be received by the NF service is an estimate of a future or subsequent value (e.g., a future anticipated data rate) and is estimated on-line or off-line. In other embodiments, the total number of packets designated to be received by the NF service is, or is representative of, a current value (e.g., the current data rate) during the same window or period of time that the representative safe data rate corresponds to. In still other embodiments, the total number of packets designated to be received by the NF service is, or is representative of, past values received by the NF service (e.g., a previous maximum data rate, an average data rate, or an initial data rate). In still yet other embodiments, the total number of packets designated to be received by the NF service is an initial or default value. In still yet other embodiments, the total number of packets designated to be received by the NF service is a minimum value. In some embodiments, step 510 is performed at the NF Data Rate Estimation Module 434, another module of the USC 215 (not shown), at the controller module 217, the controller module 218, or at another module of the network 200/300.

Flow continues from step 510 to either or both of step 512 and step 514. At step 512, it is determined how many NF instances of an NF service should be provisioned within the network 200/300 based on the determined incoming packet rate of the NF service and the representative estimated maximum safe data rate for that NF service. Details of step 512 are discussed with reference to FIGS. 14-17. In some embodiments, step 512 is performed at the NF Data Rate Estimation Module 434. At step 514, an NF service overload signal is generated based on the determined incoming packet rate of the NF service and the representative estimated maximum safe data rate for that NF service. In some embodiments, the overload signal is generated if a ratio or quotient of these two values surpasses a threshold value. In some embodiments, the overload signal is transmitted to the controller 218 or to another node of the network 200/300. In some embodiments, the overload signal contributes to network statistics collected for the network 200/300. In some embodiments, the overload signal alerts an operator of the network 200/300 of the overload state. In some embodiments, all or a portion of the process 500 is repeated at periodic intervals. In other embodiments, all or a portion of the process 500 is performed in response to an event or signal indicating that the process 500 is to be run.

Figure 6:
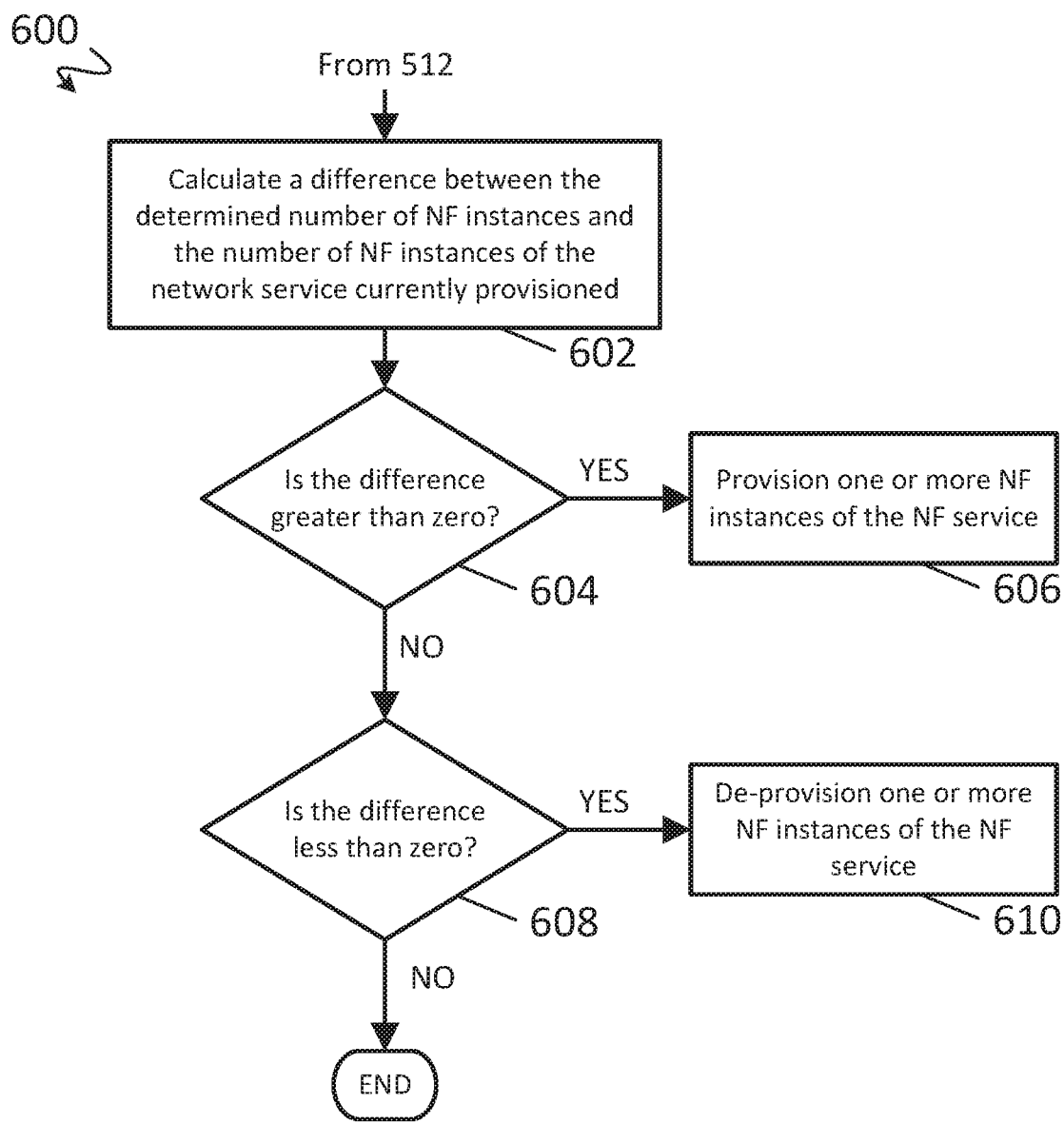

In some embodiments, flow continues from step 512 to step 602 of FIG. 6. FIG. 6 illustrates a portion of a process 600 implemented all or in part by a universal scaling controller for software network functions, in accordance with some embodiments. The particular steps, order of steps, and combination of steps are shown for illustrative and explanatory purposes only. Other embodiments can implement different particular steps, orders of steps, and combinations of steps to achieve similar functions or results.

At step 602, having determined at step 512 how many NF instances of an NF service should be provisioned in the network 200/300, a difference is calculated between that number and a number of NF instances of the NF service that are currently, or were previously, provisioned in the network. At step 604, it is determined if the difference is greater than zero. If the difference is greater than zero, flow continues to step 606. At step 606, one or more NF instances of the NF service are provisioned within the network 200/300 (e.g., as shown in FIG. 3, where additional instances of the firewall NF 311*a-n* have been provisioned). If it is determined at step 604 that the difference is not greater than zero, flow continues to step 608. At step 608, it is determined if the difference is less than zero. If the difference is less than zero, flow continues to step 610. At step 610, one or more instances of the NF service are de-provisioned (e.g., removed, halted, uninstalled, or otherwise disabled) from the network 200/300. If it is determined at step 608 that the difference is not less than zero, the portion of process 600 illustrated in FIG. 6 is complete. In some embodiments, all or a portion of the steps of process 600 are performed at the NF provisioning controller 216. In some embodiments, all or a portion of the process 600 is repeated at periodic intervals. In other embodiments, all or a portion of the process 600 is performed in response to an event or signal indicating that the process 600 is to be run.

FIGS. 7A-C provide tables of values/variables/parameters which are discussed with reference to FIGS. 8-17, in accordance with some embodiments. In general, the table shown in FIG. 7A includes parameters of the network 200/300 which cannot be controlled by the USC 215. That is, these values represent a state of the network, or parameter of an NF instance, which is considered to be fixed within at least one window of time. The table shown in FIG. 7B includes state variables of the network 200/300 and the USC 215. The table shown in FIG. 7C includes parameters of the USC 215 which can be configured, in accordance with some embodiments.

Figure 8:
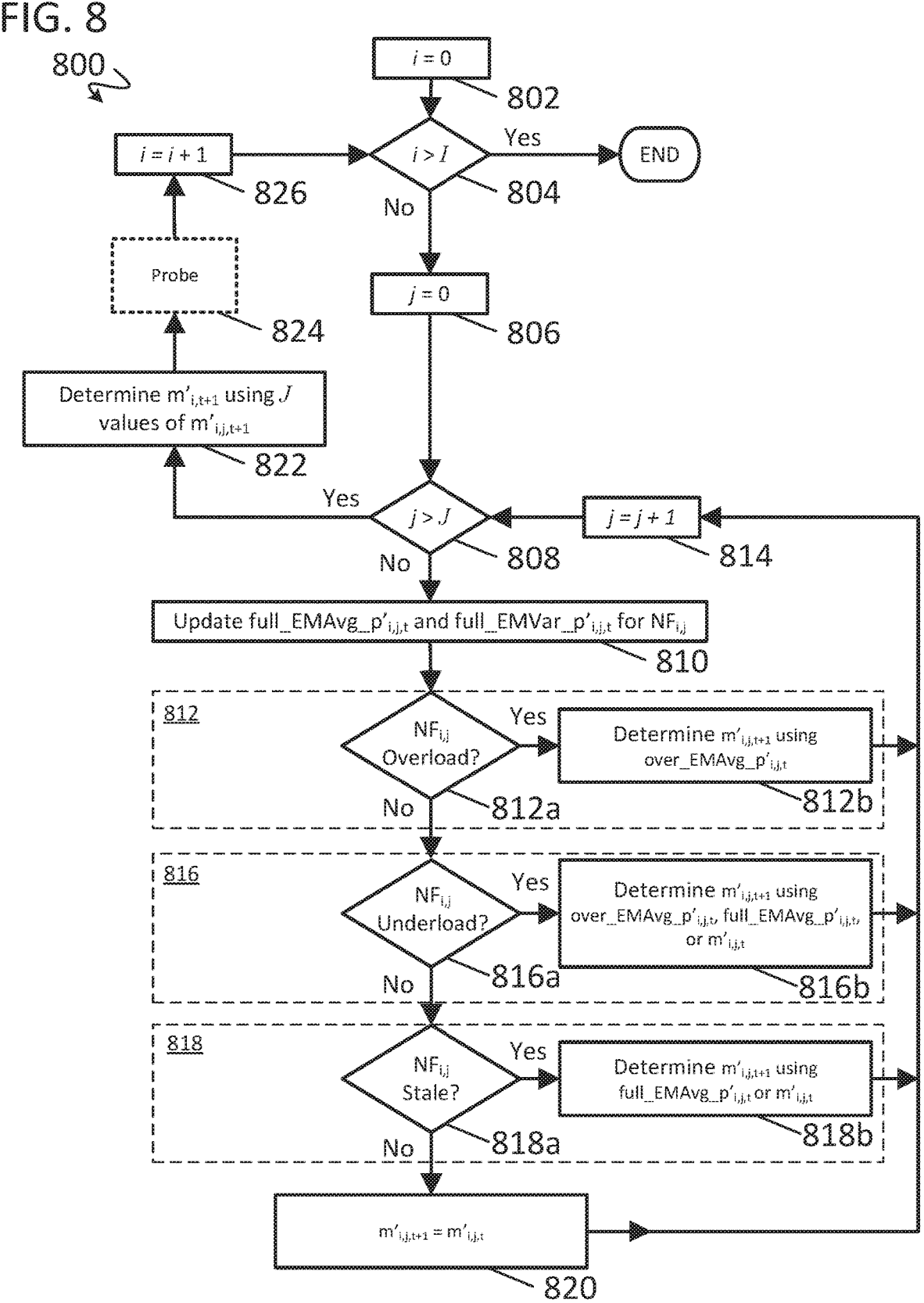
FIGS. 8-9 illustrate portions of a method for universal scaling of software network functions, in accordance with some embodiments.

FIG. 8 illustrates a portion of a method 800 for universal scaling of software network functions, in accordance with some embodiments. The particular steps, order of steps, and combination of steps are shown for illustrative and explanatory purposes only. Other embodiments can implement different particular steps, orders of steps, and combinations of steps to achieve similar functions or results. Except where otherwise specified, state variables and parameters shown and discussed with reference to FIG. 8 are defined in the tables shown in FIGS. 7A-C.

At step 802, an NF service counter variable i is initialized. Each integer value of the NF service counter variable i corresponds to one of I NF services considered by the USC 215 and is designated as $NF_i$. Each of the INF services is implemented by J NF instances of that NF service, each NF instance designated as $NF_{i,j}$. At step 804, the NF service counter variable i is tested to see if it surpasses the total number I of NF services (e.g., whether each of the I NF services has been processed/considered). If i does not surpass I, flow continues to step 806. At step 806, an NF instance counter variable j is initialized. Each integer value of the NF instance counter variable j corresponds to one of J NF instances of an NF service i. At step 808, the NF instance counter variable j is tested to see if it surpasses the total number J of NF instances of the NF service i. If j does not surpass J, flow continues to step 810.

At step 810 an exponential weighted moving average full_EMAvg_$p'_{i,j,t}$ and variance full_EMVar_$p'_{i,j,t}$ of the number of packets $p'_{i,j,t}$ (or other data unit) dequeued by $NF_{i,j}$ during a time window t is updated according to the following equations:

$$\delta = p'_{i,j,t} - \text{full\_EMAvg}\_p'_{i,j,t-1} \quad \text{(Equation 1)}$$

$$\text{full\_EMAvg}\_p'_{i,j,t} = \text{full\_EMAvg}\_p'_{i,j,t-1} \alpha \times \delta \quad \text{(Equation 2)}$$

$$\text{full\_EMVar}\_p'_{i,j,t} = (1-\alpha) \times (\text{full\_EMVar}\_p'_{i,j,t-1} + \alpha \times \delta^2) \quad \text{(Equation 3)}$$

The variable a is a tunable constant that determines how much weight new values should be given in the calculated exponential average. The time window t has a configurable duration. Other variables are described in the tables shown in FIGS. 7A-C. In some embodiments, the duration of the time window t is dynamically adjusted based on a number of packets $b_t$ entering the system during a previous time window t, or based on a number of packets $b_{i,t}$ to be processed by an NF service (NE) during a previous time window t. In other embodiments, the duration of the time window t is fixed at a particular value and is not dynamically adjusted.

Each of the process blocks 812-818 generally consider a respective state of each NF instance $NF_{i,j}$ and determines an estimated maximum number of packets $m'_{i,j,t}$ (or other data units) that the NF instance $NF_{i,j}$ can safely process during a time window t. At step 812a, it is determined if the NF instance $NF_{i,j}$, experienced overload during time window t. If $NF_{i,j}$ experienced overload during time window t, flow continues to step 812b, where $m'_{i,j,t+1}$ (e.g., an updated value of $m'_{i,j,t}$) is determined using an exponential moving average over_EMAvg_$p'_{i,j,t}$ corresponding to a number of packets (or other data units) dequeued by $NF_{i,j}$ during the time windows that $NF_{i,j}$ was overloaded. Flow then continues to step 814, where the NF instance counter variable j is incremented and a next NF instance of the NF service i is considered by repeating steps 808 through 820 until the NF instance counter variable j surpasses the number J of NF instances of NF service i. Details of block 812 are described with reference to FIG. 9. If it was determined at step 812a that $NF_{i,j}$ was not overloaded during time window t, flow continues to step 816a.

At step 816a, it is determined if $NF_{i,j}$ experienced underload during time window t. If $NF_{i,j}$ was underloaded during time window t, flow continues to step 816b, where $m'_{i,j,t+1}$ is determined using one of over_EMAvg_$p'_{i,j,t}$, full_EMAvg_$p'_{i,j,t}$, or a previous value of Details of block 816 are described with reference to FIG. 11. If it was determined at step 816a that $NF_{i,j}$ was not underloaded during time window t, flow continues to step 818a.

At step 818a, it is determined if the values of over_EMAvg_$p'_{i,j,t}$ and over_EMVAR_$p'_{i,j,t}$ corresponding to $NF_{i,j}$ are stale and as such should not necessarily be relied upon. If over_EMAvg_$p'_{i,j,t}$ and over_EMVAR_$p'_{i,j,t}$ are stale, flow continues to step 818b, where $m'_{i,j,t+1}$ is determined using one of full_EMAvg_$p'_{i,j,t}$, or a previous value of Details of block 818 are described with reference to FIG. 12. If it was determined at step 818a that over_EMAvg_$p'_{i,j,t}$ and over_EMVAR_$p'_{i,j,t}$ are not stale, flow continues to step 820. At step 820, $m'_{i,j,t+1}$ is set to a previous value of $m'_{i,j,t}$ as a default, or fallback, value given that the flow of process 800 passed through each of the decisions of steps 812a, 816a, and 818a without triggering any of the respective sub-steps 812b, 816b, or 818b.

After step 820, flow continues to step 814, and then returns to step 808, both of which were previously described. If at step 808 it is determined that the NF instance counter variable j surpasses the number J of NF instances of NF service i, flow continues to step 822. At step 822, the estimated maximum safe packet rate $m'_{i,j,t+1}$ of each NF instance j of the NF service i (i.e., J values of $m'_{i,j,t+1}$) is considered or used to determine a representative estimated maximum safe packet rate $m'_{i,t+1}$ of the NF service i. In some embodiments, the representative estimated maximum safe packet rate is the largest estimated maximum safe packet rate $m'_{i,j,t+1}$ of the J NF instances of NF service i. In other embodiments, the representative estimated maximum safe packet rate is the median estimated maximum safe packet rate $m'_{i,j,t+1}$ of the J NF instances of NF service i. In still other embodiments, the representative estimated maximum safe packet rate is an average, or other central tendency, of the J estimated maximum safe packet rates $m'_{i,j,t+1}$ of the J NF instances of NF service i.

In some embodiments, if at step 818a it was determined that one of the J NF instances of NF service i might have a stale overload distribution, an optional probing step 824 is performed. At optional probing step 824, one of several probing strategies may be performed to induce an overload state in one or more of the NF J instances of NF service i such that the respective overload distribution of the one or more NF instances $NF_{i,j}$ is updated. Optional step 824 is to prevent instances where the estimated maximum safe rate $m'_{i,j,t}$ is too low ($m'_{i,j,t} < m_{i,j,t}$), which may cause the USC 215 to provision more NF instances of the NF service i than are actually required. However, $m'_{i,j,t}$ will only increase for a given NF instance if that NF instance receives more network traffic than it can handle, pushing that NF instance into overload. Thus, in some embodiments of probing strategies, an overload condition is intentionally induced in an NF instance that was flagged at step 818a as potentially having stale data. In some embodiments of the probing step 824, $m'_{i,j}$ is incremented by a constant amount P each time step 818a indicates a stale data state for instance $m'_{i,j}$ (e.g., $m'_{i,j,t+1} = m'_{i,j,t} + P$). This will eventually result in an NF instance of NF service i being de-provisioned, which will result in a proportional increase in packets received by the remaining NF instances of that NF service.

In other embodiments of the probing step 824, a load balancer (e.g., a load balancer that is part of, or is communicatively coupled to the controller 218 or is distributed across one or more of the compute nodes 230-233) of the network 200/300 is instructed to send more network traffic to a particular NF instance of NF service i than to other NF instances of that NF service. If data continues to be flagged as stale, the load balancer continues to increase the amount of traffic to the particular NF instance until eventually $p_{i,j,t}$ is approximately equal to $m_{i,j,t}$.

In some embodiments, probing step 824 is performed if no NF instance of NF service i is overloaded and any NF instance of NF service i is underloaded. In other embodiments, probing step 824 is performed if no NF instance of NF service i has been overloaded during a configurable number of previous periods of time. In yet other embodiments, probing step 824 is performed if a configuration state or property of NF service i, or one of the NF instances of NF service i, is changed. In still yet other embodiments, probing step 824 is performed if a property of the incoming network traffic stream changes (e.g., a traffic amount, type, or change in pattern). In some embodiments, probing step 824 is suspended or exited if the amount of network traffic to be processed by NF service i is less than or equal to an amount of network traffic used to probe an NF instance of the NF service i. In such embodiments, probing step 824 is resumed if the amount of network traffic to be processed by NF service i is greater than the amount of network traffic used to probe an NF instance of the NF service i. In some embodiments, probing step 824 is suspended or exited if at least one NF instance of the NF service i is overloaded and the overload distribution of that NF instance has settled (e.g., is not changing significantly over time).

The NF service counter variable i is incremented at step 826 after either step 822 or optional step 824, and flow returns to step 804. The next NF service $NF_i$ is processed through 804-826. If at step 804, it is determined that the NF service counter variable i surpasses the number of NF services I, all of the NF services have been considered and the portion of process 800 described herein is complete. In some embodiments, all or a portion of the process 800 is repeated at periodic intervals. In other embodiments, all or a portion of the process 800 is performed in response to an event or signal indicating that the process 800 is to be run.

Figure 9:
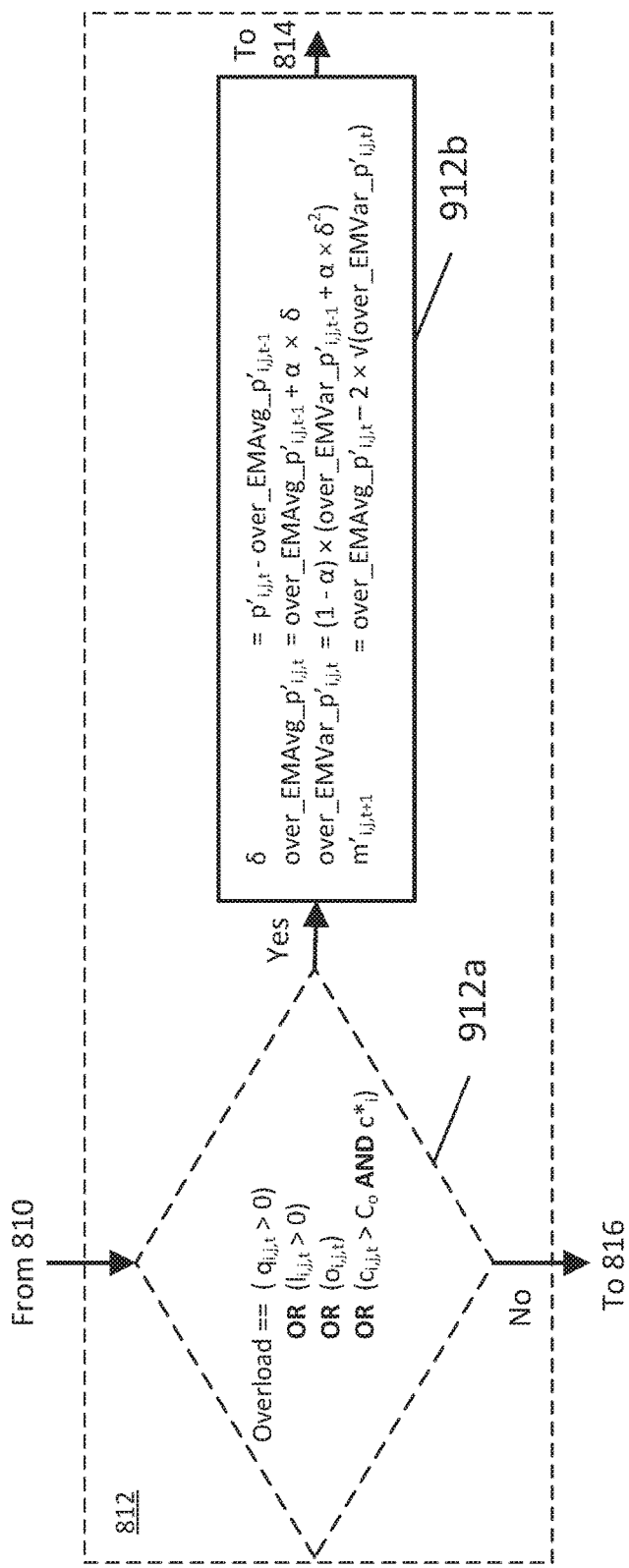

FIG. 9 provides details of block 812 described with reference to FIG. 8, in accordance with some embodiments. The particular steps, order of steps, and combination of steps are shown for illustrative and explanatory purposes only. Other embodiments can implement different particular steps, orders of steps, and combinations of steps to achieve similar functions or results. Step 912a is an example embodiment of step 812a of FIG. 8, and step 912b is an example embodiment of step 812b of FIG. 8. As shown, at step 912a, the overload state of NF instance j of NF service i is determined by a series of logical test cases. In some embodiments, $NF_{i,j}$ is considered to be in an overload state during a time window t if the queue occupancy $q_{i,j,t}$ of a network switch (e.g., the switch 240) is greater than zero at the end of the time window t (e.g., $NF_{i,j}$ was not able to process all of the packets received by the network switch during the time window t), OR a number of packets $l_{i,j,t}$ dropped from the queue of the network switch is greater than zero, OR an explicit overload signal $o_{i,j,t}$ corresponding to $NF_{i,j}$ was received by the USC 215 (e.g., from the firewall NF 211), OR the average CPU utilization $c_{i,j,t}$ associated with $NF_{i,j}$ surpassed a CPU utilization threshold level $C_o$ AND a flag or state variable $c^*_i$ indicates that CPU utilization should be considered for NF service i. In some embodiments, rather than determining if the number of packets $l_{i,j,t}$ dropped from the queue of the network switch is greater than zero, $l_{i,j,t}$ represents a percentage of switch transmissions having dropped packets and is compared to a threshold value other than to zero. That is, a software switch typically transmits packets to an NF instance in transmission sets (e.g., blocks, bursts, or sets of packets). The result of transmitting packets as a set is that some of the packets will be accepted by the NF and the some will be dropped. When an NF instance is overloaded, a few packets will be consistently dropped from each transmission set (or even from most transmission sets). In contrast, when an NF instance is not overloaded, a few packets will be dropped from isolated (e.g., not regularly occurring) transmission sets. Thus, in some embodiments, $l_{i,j,t}$ represents a percentage of transmission sets that experienced dropped packets (rather than a total number of dropped packets) and is compared to a threshold value rather than to 0 (e.g., if $l_{i,j,t}$ is greater than 5%, the NF instance is overloaded).

If based on the above criteria $NF_{i,j}$ is considered to have experienced overload during the time window t, flow continues to step 912b. At step 912b, over_EMAvg_$p'_{i,j,t}$ over_EMVar_$p'_{i,j,t}$ and the estimated maximum safe packet rate $m'_{i,j,t+1}$ are updated as follows:

$$\delta = p'_{i,j,t} - \text{over\_EMAvg\_} p'_{i,j,t-1} \quad \text{(Equation 4)}$$

$$\text{over\_EMAvg\_} p'_{i,j,t} = \text{over\_EMAvg\_} p'_{i,j,t-1} + \alpha \times \delta \quad \text{(Equation 5)}$$

$$\text{over\_EMVar\_} p'_{i,j,t} = (1-\alpha) \times (\text{over\_EMVar\_} p'_{i,j,t-1} + \alpha \times \delta^2) \quad \text{(Equation 6)}$$

$$m'_{i,j,t+1} = \text{over\_EMAvg\_} p'_{i,j,t} - 2 \times \sqrt{\text{over\_EMVar\_} p'_{i,j,t-1}} \quad \text{(Equation 7)}$$

As shown in Equation 7, in some embodiments, $m'_{i,j,t+1}$ is equal to a central tendency (e.g., an average) minus a measure of dispersion (e.g., two standard deviations). In other embodiments, $m'_{i,j,t+1}$ is equal to a central tendency other than an average. In yet other embodiments, $m'_{i,j,t+1}$ is equal to a central tendency minus a measure of dispersion that is not based on a standard deviation. After the estimated maximum safe packet rate $m'_{i,j,t}$ is updated, flow continues to step 814 as shown in FIG. 8.

Figure 10:
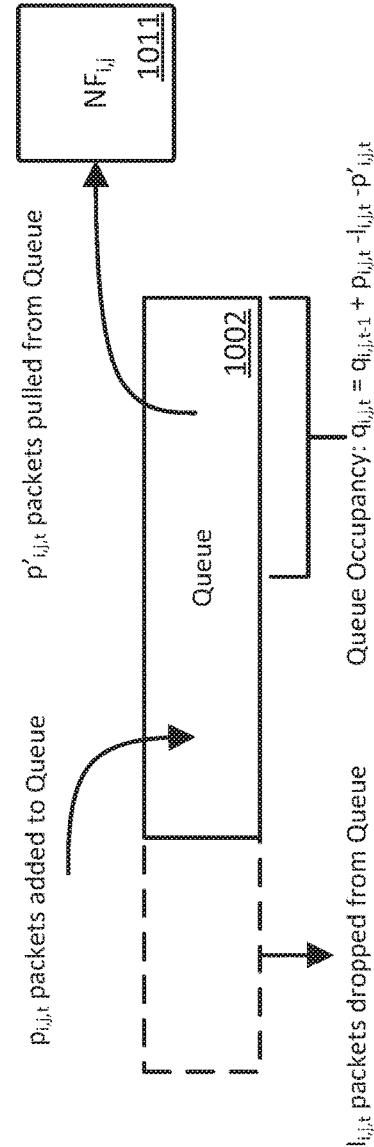
FIG. 10 illustrates a queue occupancy calculation, in accordance with some embodiments.

FIG. 10 illustrates how queue occupancy $q_{i,j,t}$ of a network switch (e.g., the switch 240) is calculated when it cannot otherwise be measured or reported directly, in accordance with some embodiments. During a time window t, queue 1002 of a network switch (e.g., the network switch 240) enqueues $p_{i,j}$ packets and dequeues packets which are subsequently transmitted to $NF_{i,j}$ 1011. Dequeued packets are considered to be packets which are processed by $NF_{i,j}$ 1011. When $NF_{i,j}$ 1011 cannot process packets as quickly as the queue 1002 of the switch is receiving packets, $NF_{i,j}$ 1011 is overloaded. That is, the number of packets $p_{i,j}$ enqueued into the queue 1002 during the time window t is greater than the number of packets $p'_{i,j}$ dequeued from the queue 1002 during the time window t. The queue 1002 having finite resources, or adhering to policy, then drops packets from the queue. Thus, as shown in FIG. 10, queue occupancy $q_{i,j,t}$ at the end of time window t is calculated as the sum of the queue occupancy $q_{i,j,t-1}$ at the end of a previous time window and the number of packets $p'_{i,j,t}$ enqueued into the queue during the time window t, minus the number of packets $l_{i,j,t}$ dropped from the queue 1002 during the time window t and minus the number of packets $p'_{i,j,t}$ dequeued from the queue 1002 during the time window t.

Figure 11:
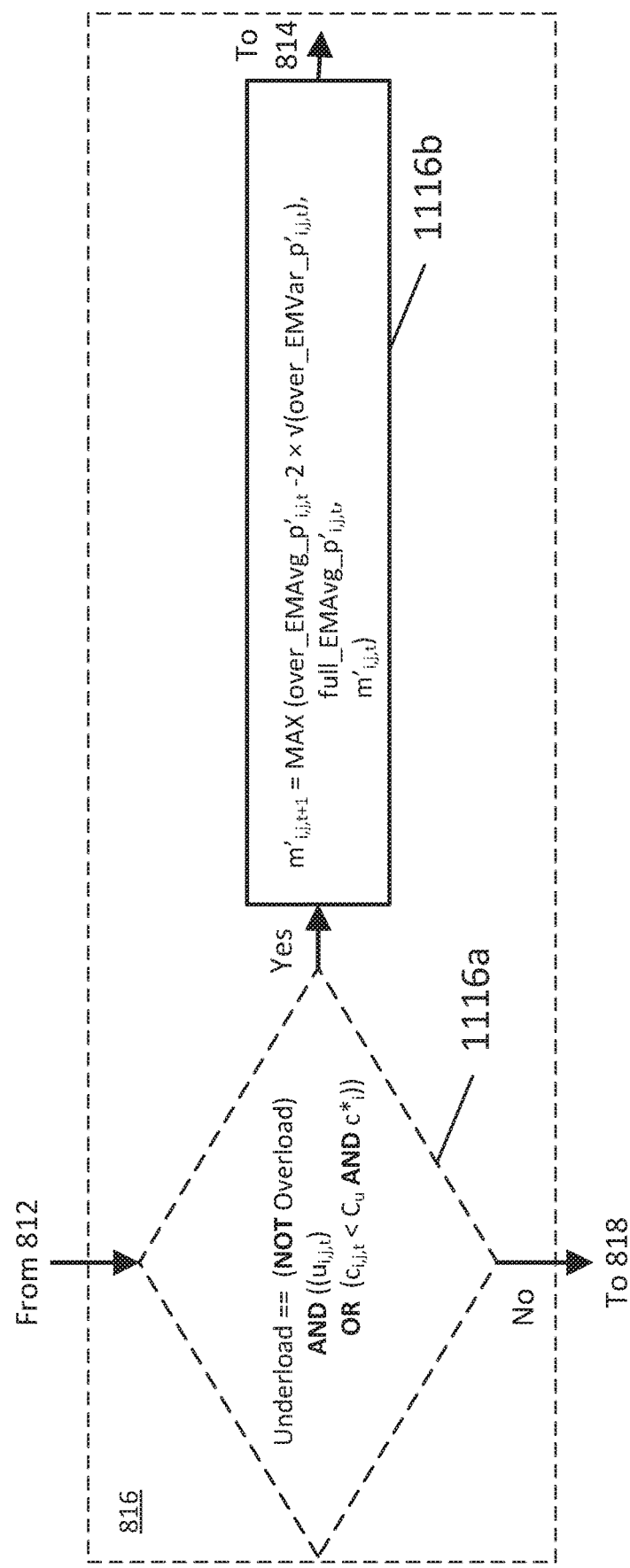
FIGS. 11-12 illustrate portions of a method for universal scaling of software network functions, in accordance with some embodiments.

FIG. 11 provides details of block 816 described with reference to FIG. 8, in accordance with some embodiments. The particular steps, order of steps, and combination of steps are shown for illustrative and explanatory purposes only. Other embodiments can implement different particular steps, orders of steps, and combinations of steps to achieve similar functions or results. Step 1116a is an example embodiment of step 816a of FIG. 8, and step 1116b is an example embodiment of step 816b of FIG. 8. As shown, at step 1116a, the underload state of NF instance j of NF service i is determined by a series of logical test cases. In some embodiments, $NF_{i,j}$ is considered to be in an underload state during a time window t if the $NF_{i,j}$ was NOT determined to be overloaded at step 812, AND either an explicit underload signal $u_{i,j,t}$ corresponding to $NF_{i,j}$ was received by the USC 215 OR the average CPU utilization $c_{i,j,t}$ associated with $NF_{i,j}$ is less than a CPU utilization threshold level $C_u$ AND a flag or state variable $c^*_i$ indicates that CPU utilization should be considered for NF service i. If based on the above criteria $NF_{i,j}$ is considered to have experienced underload during the time window t, flow continues to step 1116b. At step 1116b, the estimated maximum safe packet rate $m'_{i,j,t+1}$ is determined as follows:

$$m'_{i,j,t+1} = \text{MAX}\left(\text{over\_EMAvg\_p}'_{i,j,t} - 2 \times \sqrt{\text{over\_EMVar\_p}'_{i,j,t}},\; \text{full\_EMAvg\_p}'_{i,j,t},\; m'_{i,j,t}\right) \quad \text{(Equation 8)}$$

As illustrated in equation 8, $m'_{i,j,t+1}$ is updated using whichever is larger of a central tendency of the overload distribution minus a measure of dispersion, the central tendency of the full distribution, and the previous estimated maximum safe packet rate. After the estimated maximum safe packet rate $m'_{i,j,t+1}$ is updated, flow continues to step 814 as shown in FIG. 8.

Figure 12:
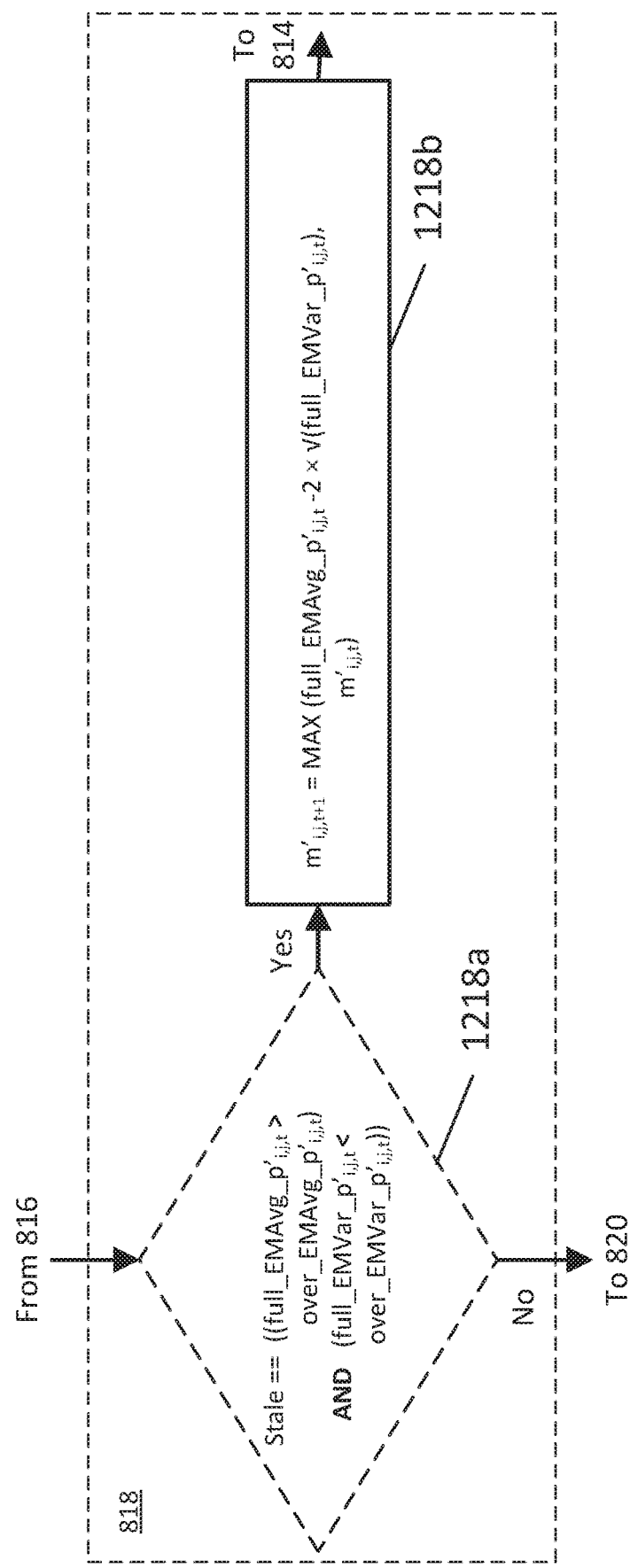
Figure 13A:
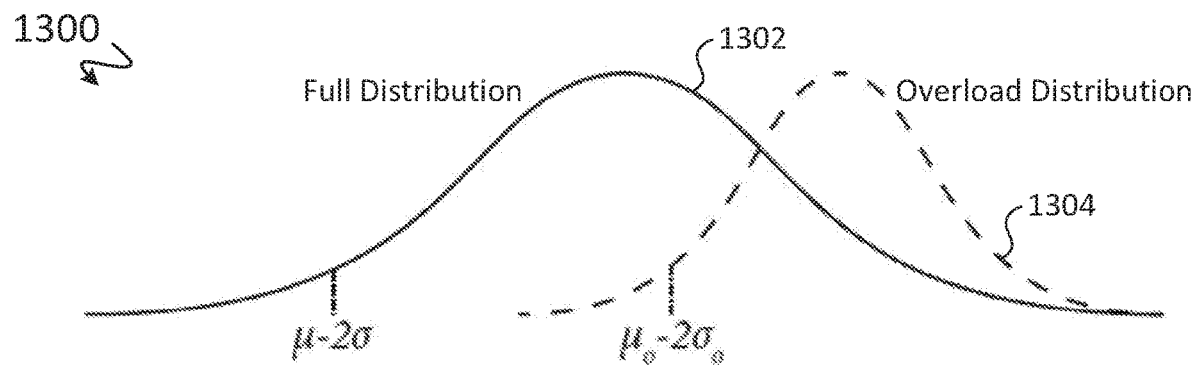
FIGS. 13A-B illustrate a relationship between distributions used by a method for universal scaling of software network functions, in accordance with some embodiments.
Figure 13B:
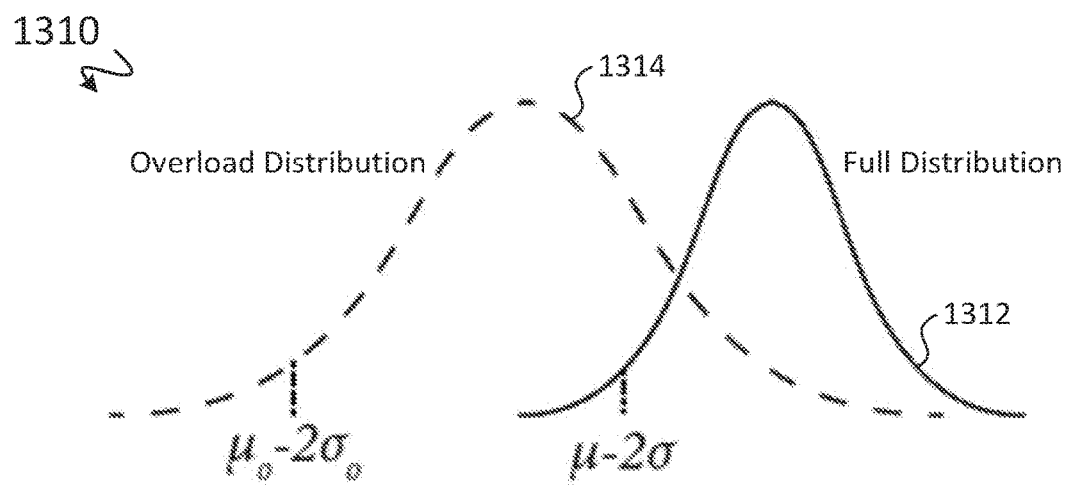

FIG. 12 provides details of block 818 described with reference to FIG. 8. In accordance with some embodiments, step 1218a is an example embodiment of step 818a, and step 1218b is an example embodiment of step 818b. The particular steps, order of steps, and combination of steps are shown for illustrative and explanatory purposes only. Other embodiments can implement different particular steps, orders of steps, and combinations of steps to achieve similar functions or results. As shown, at step 1218a, the stale state of data corresponding to NF instance j of NF service i is determined by a series of logical test cases. The overload distribution corresponding to $NF_{i,j}$ is considered to be stale if the full distribution of data packets processed by $NF_{i,j}$ during time window t has a central tendency that is greater than that of the distribution of data packets processed by $NF_{i,j}$ when it is overloaded AND the variance of the full distribution is less than the variance of the overload distribution. That is, full\_EMAvg\_p$'_{i,j,t}$ is greater than over\_EMAvg\_p$'_{i,j,t}$ AND full\_EMVar\_p$'_{i,j,t}$ is less than over\_EMVar\_p$'_{i,j,t}$. These relationships are illustrated in the simplified plots 1300 and 1310 of FIGS. 13A-B.

In plot 1300, the full distribution 1302 has a central tendency (full\_EMAvg\_p$'_{i,j,t}$) that is less than a central tendency (over\_EMAvg\_p$'_{i,j,t}$) of the overload distribution 1304. Similarly, a variance (full\_EMVar\_p$'_{i,j,t}$) of the full distribution 1302 is greater than a variance (over\_EMVar\_p$'_{i,j,t}$) of the overload distribution 1304. Thus, plot 1300 illustrates, as expected, that on average $NF_{i,j}$ processes a greater number of data packets when it receives the data packets at rate that is greater than which it can process them.

In contrast, the simplified plot of 1310 illustrates a stale data condition for data associated with $NF_{i,j}$. As shown, the full distribution 1312 has a central tendency (full\_EMAvg\_p$'_{i,j,t}$) that is greater than a central tendency (over\_EMAvg\_p$'_{i,j,t}$) of the overload distribution 1314. Similarly, a variance (full\_EMVar\_p$'_{i,j,t}$) of the full distribution 1312 is less than a variance (over\_EMVar\_p$'_{i,j,t}$) of the overload distribution 1314. Thus, plot 1310 illustrates, unexpectedly, that on average $NF_{i,j}$ processes fewer data packets when it is receiving the data packets at a rate that is greater than which it can process them. This stale data condition indicates that the overload distribution has not been updated recently, and in some embodiments, steps are taken to force the $NF_{i,j}$ into an overload state to cause the overload distribution to be updated.

If at step 1218a it was determined that data corresponding to $NF_{i,j}$ is stale, flow continues to step 1218b. At step 1218b, the estimated maximum safe packet rate $m'_{i,j,t+1}$ is determined as follows:

$$m'_{i,j,t+1} = \text{MAX}\left(\text{full\_EMAvg\_p}'_{i,j,t} - 2 \times \sqrt{\text{full\_EMVar\_p}'_{i,j,t-1}},\; m'_{i,j,t}\right) \quad \text{(Equation 9)}$$

As illustrated in equation 9, $m'_{i,j,t+1}$ is updated using whichever is larger of a central tendency of the full distribution minus a measure of dispersion, and the previous estimated maximum safe packet rate. A central tendency is a center or typical value (e.g., mean, median, mode, midrange, or other) for a probability distribution. A measure of dispersion (e.g., variability, scatter, variance, standard deviation, spread, or other) is the extent to which a distribution varies from the central tendency. After the estimated maximum safe packet rate $m'_{i,j,t+1}$ is updated, flow continues to step 814 as shown in FIG. 8.

FIGS. 14-17 provide details for alternate embodiments for determining how many NF instances of an NF service should be provisioned within the network based on the total number of packets and the representative estimated maximum safe data rate $m'_{i,t}$.

Figure 14:
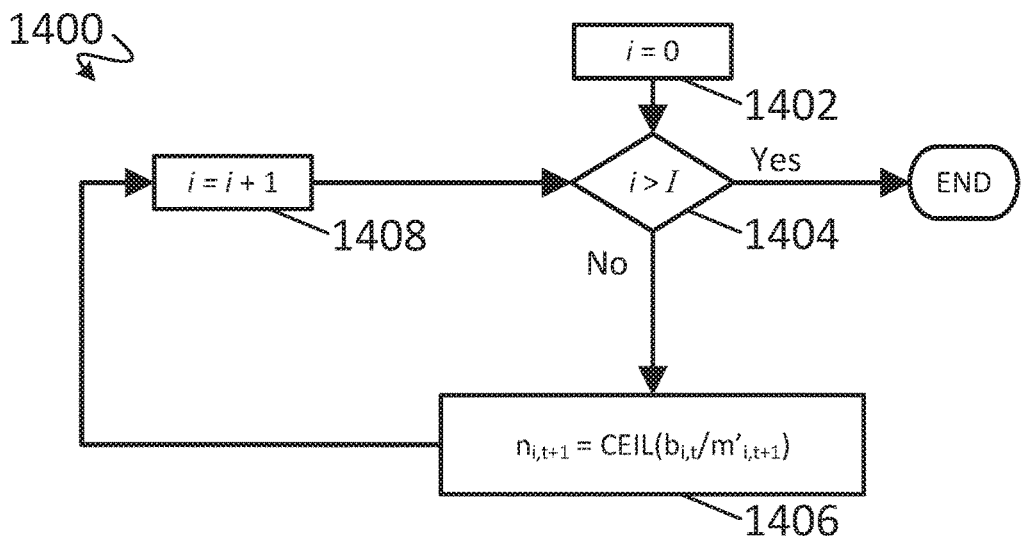
FIGS. 14-15 illustrate portions of a method for universal scaling of software network functions, in accordance with some embodiments.

In accordance with some embodiments, all or a portion of the steps of process 1400 of FIG. 14 are included as part of step 512 described with reference to FIG. 5. The particular steps, order of steps, and combination of steps are shown for illustrative and explanatory purposes only. Other embodiments can implement different particular steps, orders of steps, and combinations of steps to achieve similar functions or results. At step 1402, an NF service counter variable i is initialized. Each integer value of the NF service instance counter variable i corresponds to one of I NF services considered (e.g., monitored) by the USC 215 and is designated as $N_{Fi}$. At step 1404, the NF service counter variable i is tested to see if it surpasses the total number I of NF services (e.g., whether each of the I NF services has been processed/considered). If i does not surpass I, flow continues to step 1406. At step 1406, the number of packets $b_{i,t}$ (or other units of data) that were designated to be received by NF service $NF_i$ during time t is divided by the representative estimated maximum safe number of packets $m'_{i,t+1}$ that the NF service $NF_i$ can process during the time window t. In some embodiments, the number of packets $b_{i,t}$ is an estimate of the number of packets (or data units) designated to be received by the NF service i during the current time window. In other embodiments, the number of packets $b_{i,t}$ is an estimate of the number of packets (or data units) designated to be received by the NF service i during a subsequent time window. In still other embodiments, the number of packets $b_{i,t}$ is a direct measure of the number of packets (or data units) designated to be received by the NF service i during the current or subsequent time window. In some embodiments, the number of packets $b_{i,t}$ is an average, median, maximum, minimum, or other aggregate of previous $b_{i,t}$ values. If the quotient is a non-integer, it is rounded up to the next integer value (e.g., using a ceiling function CEIL). The rounded quotient is used as the number of NF instances $n_{i,t+1}$ of the NF service NE which should be provisioned within the network during time window t+1. Flow continues to step 1408, where the NF service counter variable i is incremented, so that the next NF service $NF_i$ is processed through 1404-1406. At step 1404, if it is determined that the NF service counter variable i surpasses the number of NF services I, i.e., all of the NF services have been processed, then the process 1400 is complete. In some embodiments, all or a portion of the process 1400 is repeated at periodic intervals. In other embodiments, all or a portion of the process 1400 is performed in response to an event or signal indicating that the process 1400 is to be run.

Figure 15:
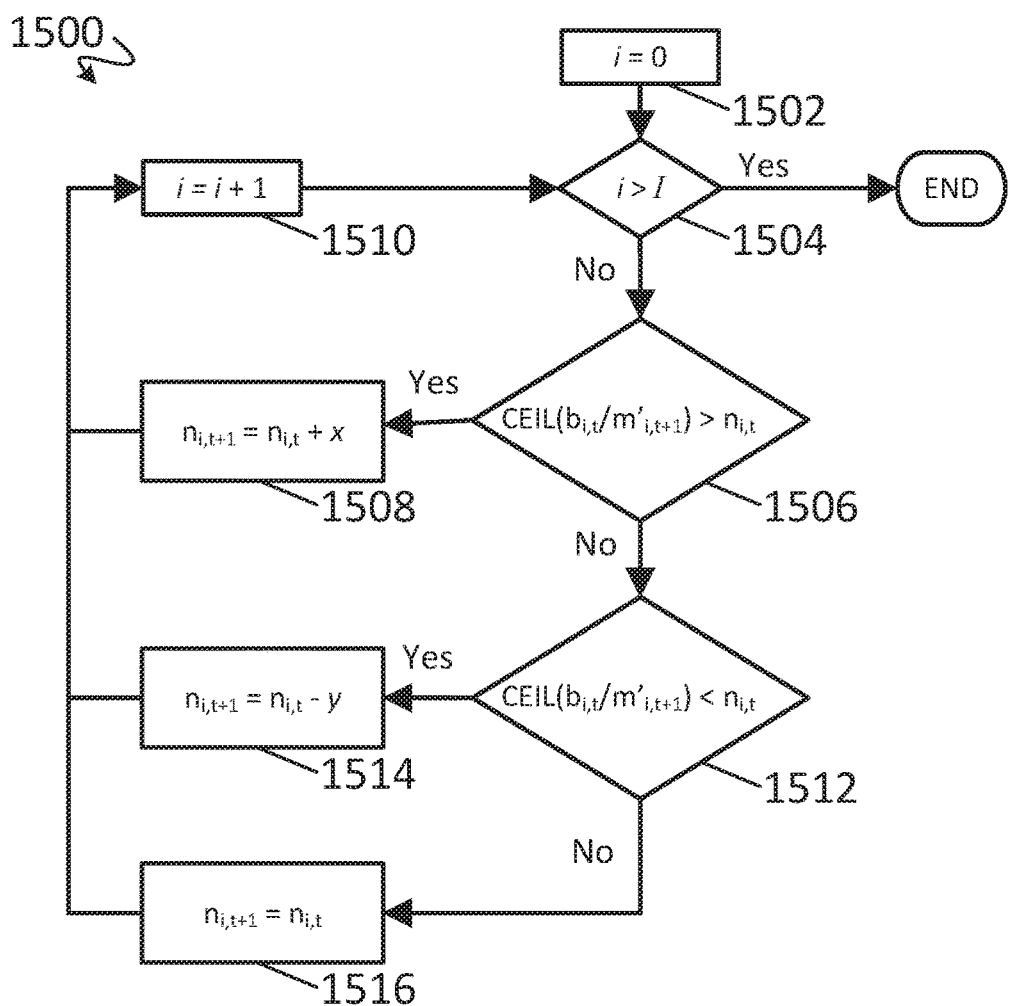

In accordance with other embodiments, all or a portion of the steps of process 1500 of FIG. 15 are included as part of step 512 described with reference to FIG. 5. The particular steps, order of steps, and combination of steps are shown for illustrative and explanatory purposes only. Other embodiments can implement different particular steps, orders of steps, and combinations of steps to achieve similar functions or results. At step 1502, an NF service counter variable i is initialized. Each integer value of the NF service instance counter variable i corresponds to one of I NF services considered by the USC 215 and is designated as $NF_i$. At step 1504, the NF service counter variable i is tested to see if it surpasses the total number I of NF services (e.g., whether each of the I NF services has been processed/considered). If i does not surpass I, flow continues to step 1506. At step 1506, the number of packets $b_{i,t}$ (or other units of data) that were designated to be received by NF service $NF_i$ during time t is divided by the representative estimated maximum safe number of packets $m'_{i,t+1}$ that the NF service $NF_i$ can process during the time window t. In some embodiments, the number of packets $b_{i,t}$ is an estimate of the number of packets (or data units) designated to be received by the NF service i during the current time window. In other embodiments, the number of packets $b_{i,t}$ is an estimate of the number of packets (or data units) designated to be received by the NF service i during a subsequent time window. In still other embodiments, the number of packets $b_{i,t}$ is a direct measure of the number of packets (or data units) designated to be received by the NF service i during the current or subsequent time window. In some embodiments, the number of packets $b_{i,t}$ is an average, median, maximum, minimum, or other aggregate of previous $b_{i,t}$ values. If the quotient is a non-integer, it is rounded up to the next integer value (e.g., using a ceiling function). If the rounded quotient is greater than the number of NF instances $n_{i,t}$ of the NF service $NF_i$ currently provisioned in the network, flow continues to step 1508. At step 1508, the number of NF instances of the NF service $NF_i$ is incremented by an integer value x (e.g., 1, 2, 3, or another integer value). Flow continues to step 1510, where the NF service counter variable i is incremented, so that the next NF service $NF_i$ is processed.

If at step 1506 the rounded quotient is not greater than the number of NF instances $n_{i,t}$ of the NF service $NF_i$ currently provisioned in the network, flow continues to step 1512. At step 1512, if it is determined if the rounded quotient is less than the number of NF instances $n_{i,t}$ of the NF service $NF_i$ currently provisioned in the network, flow continues to step 1514. At step 1514, the number of NF instances $n_{i,t+1}$ of the NF service $NF_i$ is decremented by an integer value y (e.g., 1, 2, 3, or another integer value). In some embodiments, the integer value y used to decrement $n_{i,t}$ at step 1514 is different than the integer value x used to increment $n_{i,t}$ at step 1508. In other embodiments, the integer value y used to decrement $n_{i,t}$ at step 1514 is the same as the integer value x used to increment $n_{i,t}$ at step 1508. Flow continues to step 1510, where the NF service counter variable i is incremented, so that the next NF service $NF_i$ is processed.

If at step 1512 the rounded quotient is not less than the number of NF instances $n_{i,t}$ of the NF service $NF_i$ currently provisioned in the network, flow continues to step 1516. At step 1516, the current number of NF instances $n_{i,t}$ of the NF service NE is used as the updated number of NF instances $n_{i,t+1}$ of the NF service $NF_i$. Flow then continues to step 1510, where the NF service counter variable i is incremented, so that the next NF service $NF_i$ is processed. At step 1504, if it is determined that the NF service counter variable i surpasses the number of NF services I, i.e., all of the NF services have been processed, then the process 1500 is complete. In some embodiments, all or a portion of the process 1500 is repeated at periodic intervals. In other embodiments, all or a portion of the process 1500 is performed in response to an event or signal indicating that the process 1500 is to be run.

Figures 16, 17:
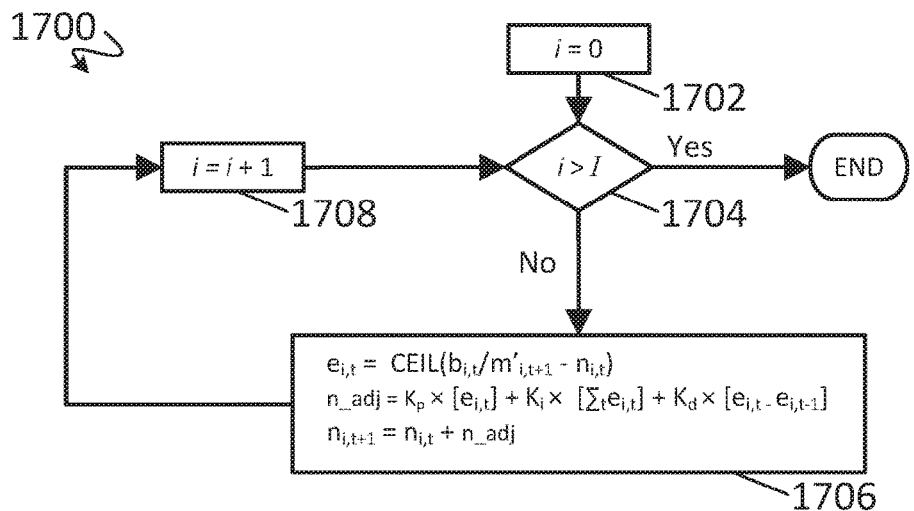
FIG. 16 is a table of configurable parameters determined by, or used for, a method for universal scaling of software network functions, in accordance with some embodiments.
FIG. 17 illustrates a portion of a method for universal scaling of software network functions, in accordance with some embodiments.

FIG. 16 includes a table of state variables and parameters described with reference to FIG. 17. The particular steps, order of steps, and combination of steps of FIG. 17 are shown for illustrative and explanatory purposes only. Other embodiments can implement different particular steps, orders of steps, and combinations of steps to achieve similar functions or results. In accordance with other embodiments, all or a portion of the steps of process 1700 of FIG. 17 are included as part of step 512 described with reference to FIG. 5. At step 1702, an NF service counter variable i is initialized. Each integer value of the NF service instance counter variable i corresponds to one of I NF services considered by the USC 215 and is designated as $NF_i$. At step 1704, the NF service counter variable i is tested to see if it surpasses the total number I of NF services (e.g., whether each of the I NF services has been processed/considered). If i does not surpass I, flow continues to step 1706. At step 1706, a proportional-integral-derivative (PID) control loop is updated according to the following equations:

$$e_{i,t} = CEIL\left(\frac{b_{i,t}}{m'_{i,t+1}} - n_{i,t}\right) \quad \text{(Equation 10)}$$

$$n\_adj = K_p \times [e_{i,t}] + K_i \times \left[\sum_t e_{i,t}\right] + K_d \times [e_{i,t} - e_{i,t-1}] \quad \text{(Equation 11)}$$

$$n_{i,t+1} = n_{i,t} + n\_adj \quad \text{(Equation 12)}$$

The response of the PID loop at step 1706 is configured using an adjustable proportional gain variable $K_p$, an adjustable integral gain variable $K_i$, and an adjustable derivative gain variable $K_d$. Tuning the response of a PID loop using such gain variables is understood by one of skill in the art. The output of the PID loop at each iteration is a delta n_adj of NF instances of NF service i that should be added to, or subtracted from, the current number of NF instances $n_{i,t}$ of the NF service. In some embodiments, the number of packets $b_{i,t}$ is an estimate of the number of packets (or data units) designated to be received by the NF service i during the current time window. In other embodiments, the number of packets $b_{i,t}$ is an estimate of the number of packets (or data units) designated to be received by the NF service i during a subsequent time window. In still other embodiments, the number of packets $b_{i,t}$ is a direct measure of the number of packets (or data units) designated to be received by the NF service i during the current or subsequent time window. In some embodiments, the number of packets $b_{i,t}$ is an average, median, maximum, minimum, or other aggregate of previous $b_{i,t}$ values. Flow continues to step 1708, where the NF service counter variable i is incremented, so that the next NF service $NF_i$ is processed similarly. At step 1704, if it is determined that the NF service counter variable i surpasses the number of NF services I, i.e., all of the NF services have been processed, then the process 1700 is complete. In some embodiments, all or a portion of the process 1700 is repeated at periodic intervals. In other embodiments, all or a portion of the process 1700 is performed in response to an event or signal indicating that the process 1700 is to be run.

In some embodiments, after each of the processes 1500, 1400, or 1700 has completed, if $n_{i,t+1}$ is greater than the number of NF instances $n_{i,t}$ of the NF service $NF_i$ currently provisioned in the network, additional NF instances are provisioned. If $n_{i,t+1}$ is less than the number of NF instances $n_{i,t}$ of the NF service $NF_i$ currently provisioned in the network, superfluous NF instances are de-provisioned. In some embodiments, additional NF instances are provisioned, or superfluous NF instances are de-provisioned for each NF service after all I NF services have been processed by the USC 215. In other embodiments, additional NF instances are provisioned, or superfluous NF instances are de-provisioned after each NF service is processed by the USC 215.

Figure 18:
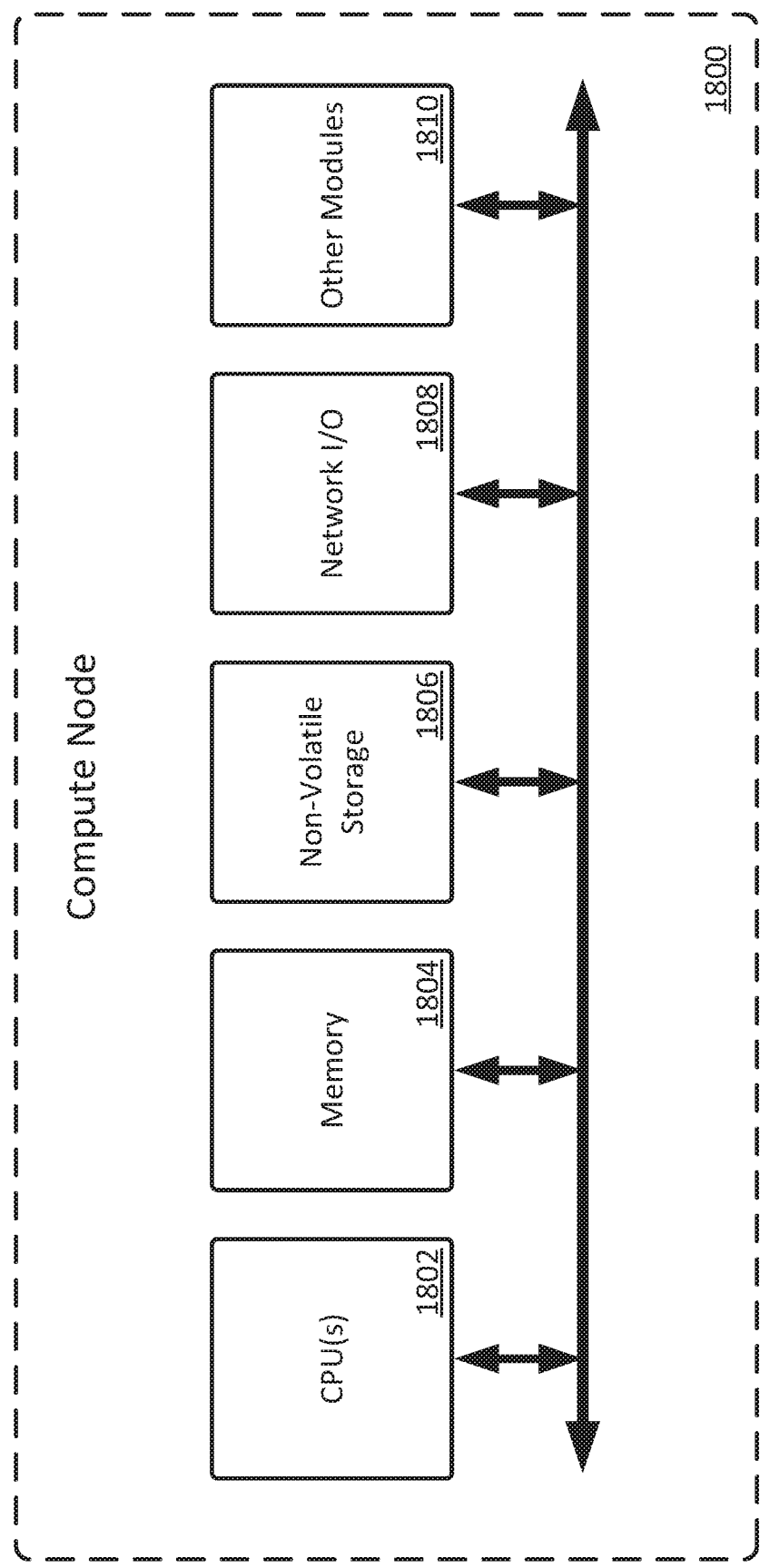
FIG. 18 illustrates an example compute node of a network with a universal scaling controller for software network functions, in accordance with some embodiments.

FIG. 18 illustrates an example compute node 1800 of the network 300, in accordance with some embodiments. In some embodiments, one or more of the compute nodes 230-233 are the same or similar to the compute node 1800. The compute node 1800 generally includes one or more CPUs 1802, a memory module 1804 (e.g., RAM), a non-volatile data storage module 1806 (e.g., a hard drive or array of hard drives), a network I/O module 1808 (e.g., a network interface card (NIC) and/or a top-of-rack interface), and other modules 1810 such as user I/O, wireless communication modules, optical communication modules, system diagnostic or monitoring modules, or other modules. In some embodiments, the compute node 1800 is configured to perform all or a portion of the processes 500, 600, 800, 1400, 1500, and 1700. In some embodiments, the USC 215 is implemented at the compute node 1800 or at a compute node that is similar to the compute node 1800.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
   receiving, at a switch of a network, a batch of data units during a first period of time, the network further comprising i) one or more network function (NF) instances of an NF service, and ii) a scaling controller;
   transmitting, from the switch to a first NF instance of the one or more NF instances, one or more units of data of the batch of data units during the first period of time;
   determining, by the switch or by one or more controllers of the network, an estimated maximum safe data unit rate for the first NF instance;
   determining, by the switch or by the one or more controllers, a representative estimated maximum safe data unit rate for the NF service using the estimated maximum safe data unit rate;
   determining, by the switch or by the one or more controllers, an incoming data unit rate of the NF service; and
   determining, at the scaling controller, a total number of NF instances of the NF service to be provisioned in the network using the determined incoming data unit rate of the NF service and the representative estimated maximum safe data unit rate of the NF service.

2. The method of claim 1, further comprising:
   calculating a difference of the total number of NF instances of the NF service to be provisioned in the network and a total number of the NF instances comprised by the NF service;
   provisioning, by an NF provisioning controller, a first number of NF instances of the one or more NF instances upon determining that the difference is greater than zero; and
   de-provisioning, by the NF provisioning controller, a second number of NF instances of the one or more NF instances upon determining that the difference is less than zero.

3. The method of claim 1, wherein determining the representative estimated maximum safe data unit rate comprises:
   determining respective estimated maximum safe data unit rates for each of the one or more NF instances; and
   using a largest value of the respective estimated maximum safe data unit rates as the representative estimated maximum safe data unit rate.

4. The method of claim 1, wherein determining the representative estimated maximum safe data unit rate comprises:
   determining respective estimated maximum safe data unit rates for each of the one or more NF instances; and
   using a measure of central tendency of the respective estimated maximum safe data unit rates as the representative estimated maximum safe data unit rate.

5. The method of claim 1, wherein determining the estimated maximum safe data unit rate for the first NF instance comprises:
   determining a first number of data units of the batch of data units that were transmitted from the switch to the first NF instance during the first period of time;
   determining that the first NF instance was in an overload state during the first period of time;
   calculating a first measure of central tendency corresponding to how many data units were transmitted from the switch to the first NF instance while in the overload state using the determined first number of data units and a previous number of data units that were transmitted from the switch to the first NF instance during a previous period of time that the first NF instance was in the overload state; and
   determining, using the first measure of central tendency, the estimated maximum safe data unit rate for the first NF instance.

6. The method of claim 5, wherein determining, using the first measure of central tendency, the estimated maximum safe data unit rate for the first NF instance comprises:
using the first measure of central tendency minus a measure of dispersion as the estimated maximum safe data unit rate.

7. The method of claim 5, wherein determining, using the first measure of central tendency, the estimated maximum safe data unit rate for the first NF instance comprises:
comparing the first measure of central tendency to a second measure of central tendency, the second measure of central tendency corresponding to a determined second number of data units transmitted from the switch to the first NF instance for a plurality of batches during a plurality of previous periods of time irrespective of the overload state of the first NF instance; and
upon determining that the second measure of central tendency is greater than the first measure of central tendency, using the second measure of central tendency as the estimated maximum safe data unit rate.

8. The method of claim 5, wherein determining that the first NF instance was in an overload state during the first period of time comprises:
determining that a second number of data units that are stored in a data unit queue of the switch during the first period of time is greater than a threshold value.

9. The method of claim 5, wherein determining that the first NF instance was in an overload state during the first period of time comprises:
determining that a second number of data units that were dropped from a data unit queue of the switch during the first period of time is greater than a threshold value.

10. The method of claim 5, wherein determining that the first NF instance was in an overload state during the first period of time comprises:
determining that a latency of the first NF instance is greater than a threshold latency value.

11. The method of claim 5, wherein determining that the first NF instance was in an overload state during the first period of time comprises:
determining that an average central processing unit (CPU) utilization of the first NF instance during the first period of time is greater than a threshold value.

12. The method of claim 5, wherein determining that the first NF instance was in an overload state during the first period of time comprises:
receiving, at the scaling controller from the first NF instance, a signal indicating that the first NF instance is in the overload state during the first period of time.

13. The method of claim 1, further comprising:
transmitting, from the switch to the first NF instance, a plurality of data units at a data unit rate that is greater than the estimated maximum safe data unit rate of the first NF instance.

14. The method of claim 1, wherein determining a total number of NF instances of the NF service to be provisioned in the network comprises:
calculating a quotient of the determined incoming data unit rate for the NF service divided by the representative estimated maximum safe data unit rate;
calculating an integer value based on the quotient; and
using the integer value as the total number of NF instances of the NF service to be provisioned in the network.

15. The method of claim 1, wherein determining a total number of NF instances of the NF service to be provisioned in the network comprises:
calculating a quotient of the determined incoming data unit rate for the NF service divided by the representative estimated maximum safe data unit rate;
calculating, using a control loop, a control loop value, the control loop having parameters comprising a proportional scalar value, an integral scalar value, and a derivative scalar value, and the control loop receiving the quotient as an input; and
using the control loop value as the total number of NF instances of the NF service to be provisioned in the network.

16. The method of claim 1, wherein determining a total number of NF instances of the NF service to be provisioned in the network comprises:
calculating a quotient of the determined incoming data unit rate for the NF service divided by the representative estimated maximum safe data unit rate;
calculating a rounded integer value that is equal to or greater than the quotient;
determining a first number of NF instances that are provisioned in the network;
calculating, upon determining that the rounded integer value is greater than the first number of NF instances, a sum of the first number of NF instances and a first integer value and using the sum as the total number of NF instances of the NF service to be provisioned in the network; and
calculating, upon determining that the rounded integer value is less than the first number of NF instances, a difference of the first number of NF instances and a second integer value and using the difference as the total number of NF instances of the NF service to be provisioned in the network.

17. The method of claim 16, wherein:
the first integer value is equal to the second integer value.

18. The method of claim 1, further comprising:
calculating a difference of a first number of data units received by the switch during the first period of time and a previous number of data units received by the switch during a previous period of time, the first period of time having a first duration;
determining a second duration for a second period of time based on the calculated difference; and
receiving, at the switch, a second batch of data units during the second period of time;
wherein:
the second duration is not equal to the first duration.

19. The method of claim 1, further comprising:
calculating a difference of a first number of data units received by the switch during the first period of time and a previous number of data units received by the switch during a previous period of time, the first period of time having a first duration;
determining a second duration for a second period of time based on the calculated difference; and
receiving, at the switch, a second batch of data units during the second period of time;
wherein:
the second duration is equal to the first duration.

20. A method comprising:
determining, by a switch of a network or by one or more controllers of the network, a first total number of data units transmitted from a node of the network to a network function (NF) instance of the network during a period of time, the NF instance being an instance of an NF service;

determining, by the switch or by the one or more controllers, a second total number of data units designated to be received by the NF instance during the period of time;

determining, by the switch or by the one or more controllers, an estimated maximum safe data unit rate for the NF instance based on the first total number of data units transmitted from the node and the second total number of data units designated to be received by the NF instance;

determining, by the switch or by the one or more controllers, a representative estimated maximum safe data unit rate for the NF service using the estimated maximum safe data unit rate;

estimating, at a scaling controller of the network, a third total number of data units designated to be received by the NF service during a subsequent period of time, the scaling controller being one of the one or more controllers; and determining, at the scaling controller, a total number of NF instances of the NF service to be provisioned in the network using the estimated third total number of data units designated to be received by the NF service and the representative estimated maximum safe data unit rate of the NF service.

21. A method comprising:

determining, by a switch of a network or by one or more controllers of the network, a first total number of data units transmitted from a node of the network to a network function (NF) instance of the network during a period of time, the NF instance being an instance of an NF service;

determining, by the switch or by the one or more controllers, a second total number of data units designated to be received by the NF instance during the period of time;

determining, by the switch or by the one or more controllers, an estimated maximum safe data unit rate for the NF instance based on the first total number of data units transmitted from the node and the second total number of data units designated to be received by the NF instance;

determining, by the switch or by the one or more controllers, a representative estimated maximum safe data unit rate for the NF service using the estimated maximum safe data unit rate;

estimating, at a scaling controller of the network, a third total number of data units designated to be received by the NF service during a subsequent period of time, the scaling controller being one of the one or more controllers; and generating, at the scaling controller, an overload signal based on the estimated third total number of data units designated to be received by the NF service and the representative estimated maximum safe data unit rate of the NF service.

\* \* \* \* \*